United States Patent
Worley, Jr. et al.

(10) Patent No.: US 8,341,727 B2
(45) Date of Patent: Dec. 25, 2012

(54) METHOD AND SYSTEM FOR PROTECTING A COMPUTER SYSTEM FROM DENIAL-OF-SERVICE ATTACKS AND OTHER DELETERIOUS RESOURCE-DRAINING PHENOMENA RELATED TO COMMUNICATIONS

(75) Inventors: William S. Worley, Jr., Centennial, CO (US); James Garnett, Bellingham, WA (US); Christopher Worley, Centennial, CO (US); Matthew H. Gerlach, Santa Cruz, CA (US)

(73) Assignee: Se Cure 64 Software Corporation, Greenwood Village, CO (US)

( * ) Notice: Subject to any disclaimer, the term of this patent is extended or adjusted under 35 U.S.C. 154(b) by 1186 days.

(21) Appl. No.: 12/075,600

(22) Filed: Mar. 10, 2008

(65) Prior Publication Data
US 2008/0256623 A1 Oct. 16, 2008

Related U.S. Application Data

(60) Provisional application No. 60/906,318, filed on Mar. 9, 2007.

(51) Int. Cl.
*G06F 15/173* (2006.01)
(52) U.S. Cl. .......... 726/14; 709/223; 709/224; 709/225; 709/226
(58) Field of Classification Search .............. 725/62–63; 380/200, 210; 713/153–154; 709/223–229; 726/11–14
See application file for complete search history.

(56) References Cited

U.S. PATENT DOCUMENTS

| | | | |
|---|---|---|---|
| 2002/0055983 A1* | 5/2002 | Goddard | 709/217 |
| 2003/0007644 A1* | 1/2003 | Sprunk | 380/277 |
| 2003/0023733 A1* | 1/2003 | Lingafelt et al. | 709/229 |
| 2004/0003286 A1 | 1/2004 | Kaler et al. | |
| 2004/0258076 A1* | 12/2004 | Jha et al. | 370/395.5 |
| 2005/0281269 A1* | 12/2005 | Choi | 370/395.2 |
| 2006/0075491 A1* | 4/2006 | Lyon | 726/22 |
| 2006/0077964 A1* | 4/2006 | Wu et al. | 370/352 |
| 2007/0044142 A1* | 2/2007 | Yoon et al. | 726/3 |
| 2007/0121908 A1* | 5/2007 | Benedyk et al. | 379/350 |
| 2007/0214269 A1* | 9/2007 | Davidsson | 709/227 |

* cited by examiner

*Primary Examiner* — Eleni Shiferaw
*Assistant Examiner* — Phy Anh Vu
(74) *Attorney, Agent, or Firm* — Olympic Patent Works, PLLC

(57) ABSTRACT

Embodiments of the present invention include a variety of different integrated, multi-tiered methods and systems for preventing various types of attacks on computer systems, including denial-of-service attacks and SYN-flood attacks. Components of these integrated methods and systems include probabilistic packet droppers, packet-rate throttles, resource controls, automated firewalls, and efficient connection-state-information storage in memory resources and connection-state-information distribution in order to prevent draining of sufficient communications-related resources within a computer system to seriously degrade or disable electronics communications components within the computer system.

17 Claims, 27 Drawing Sheets

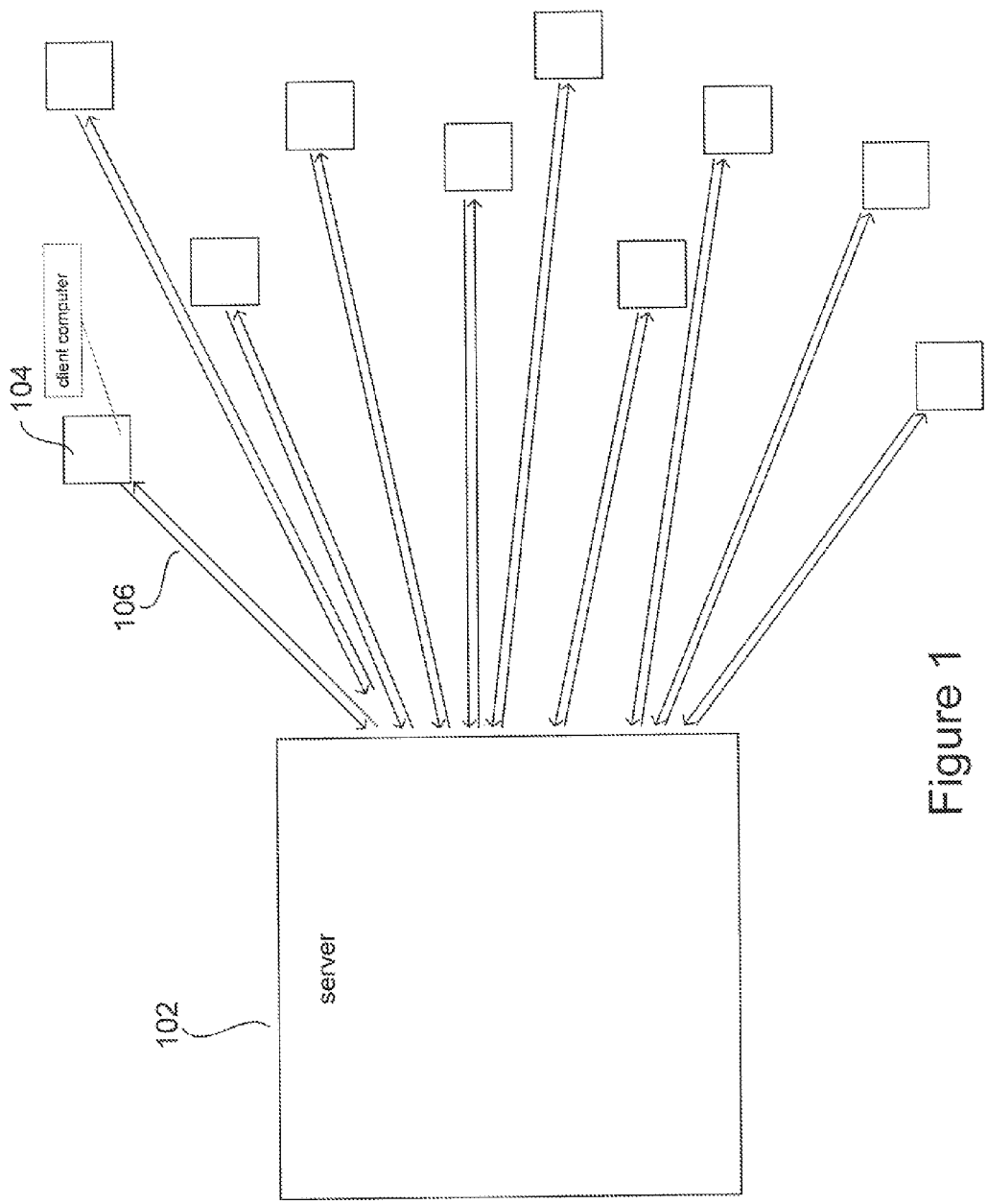

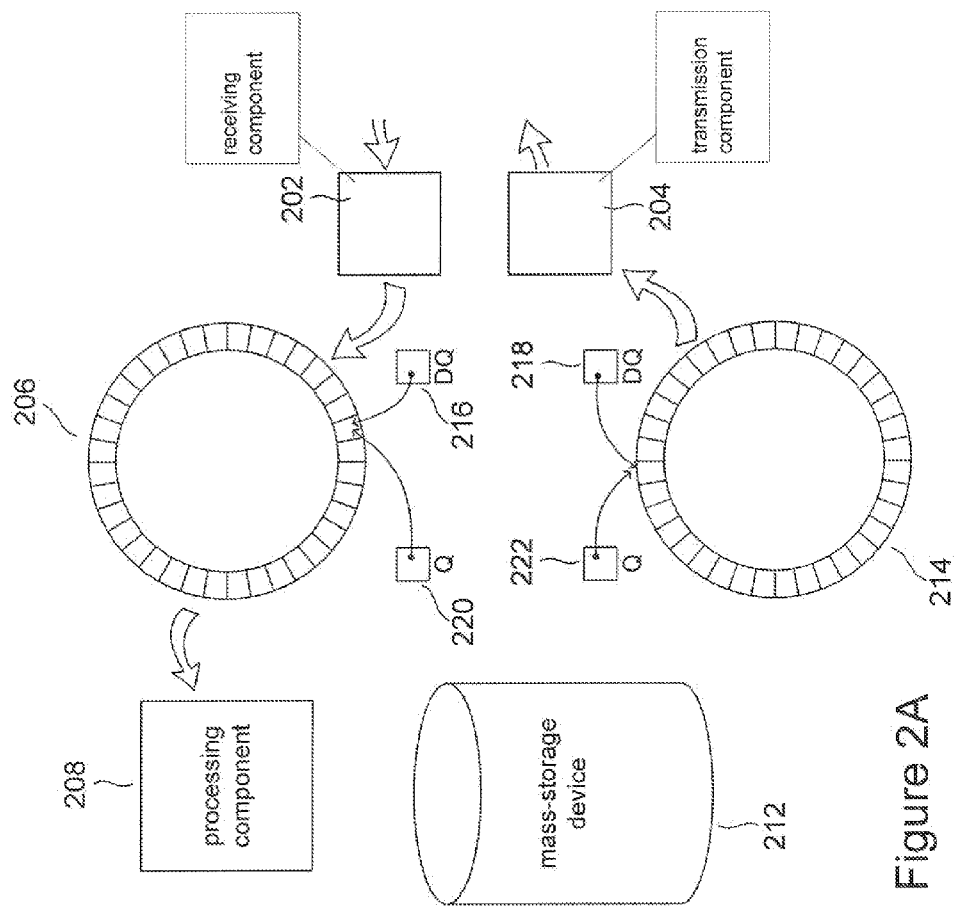
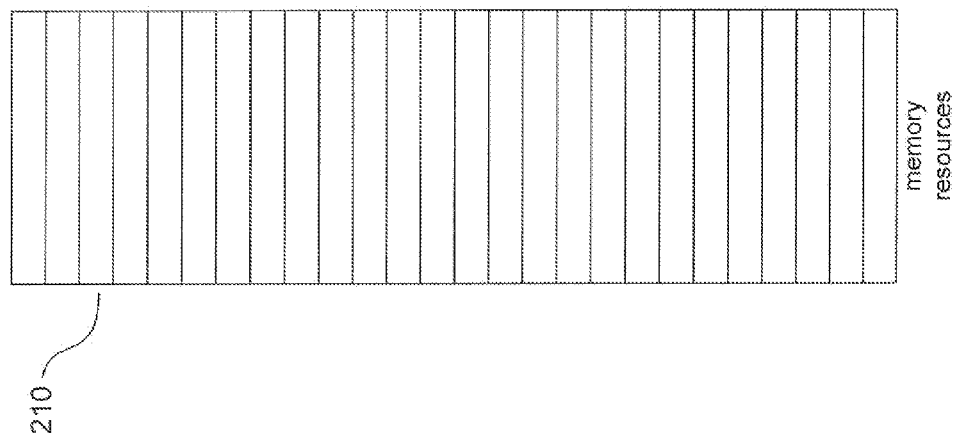
Figure 2A

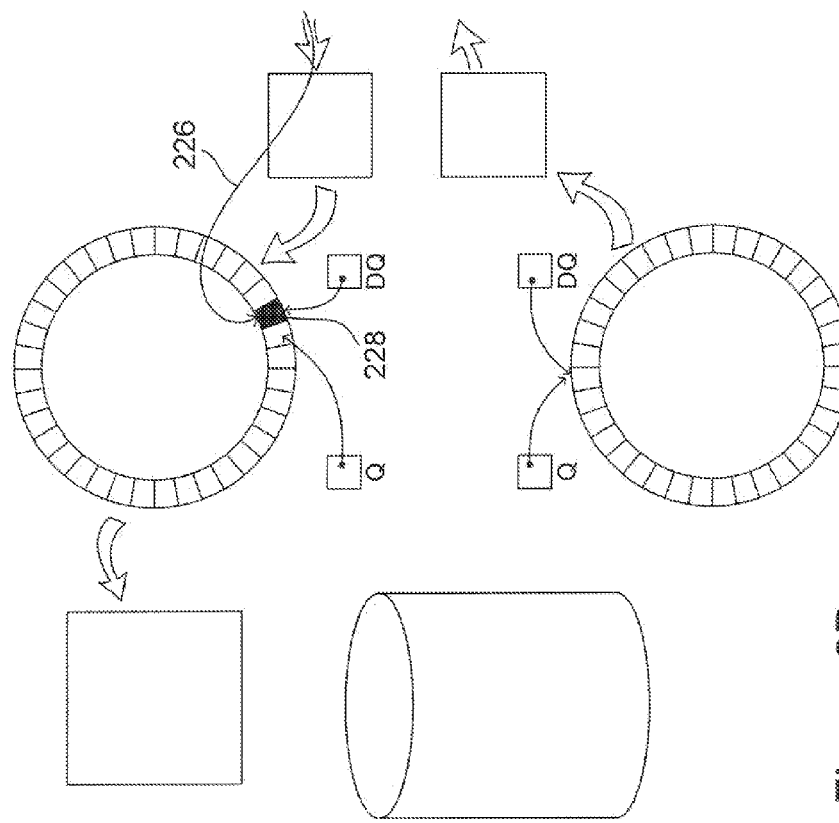
Figure 2B
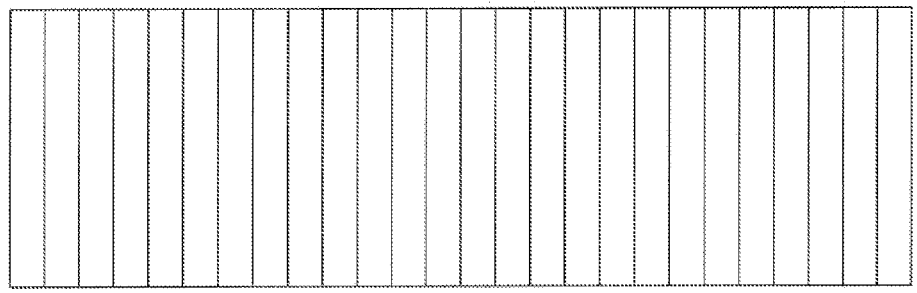

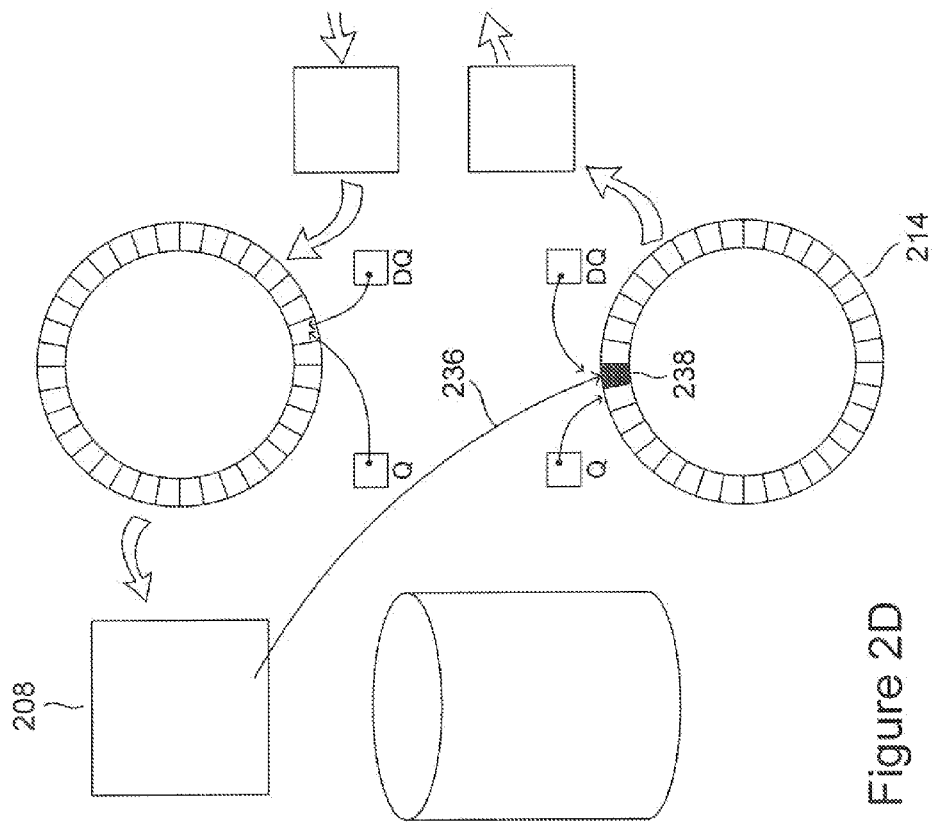
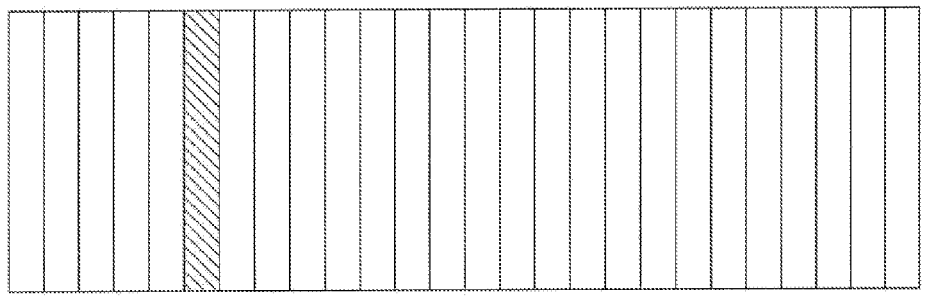
Figure 2D

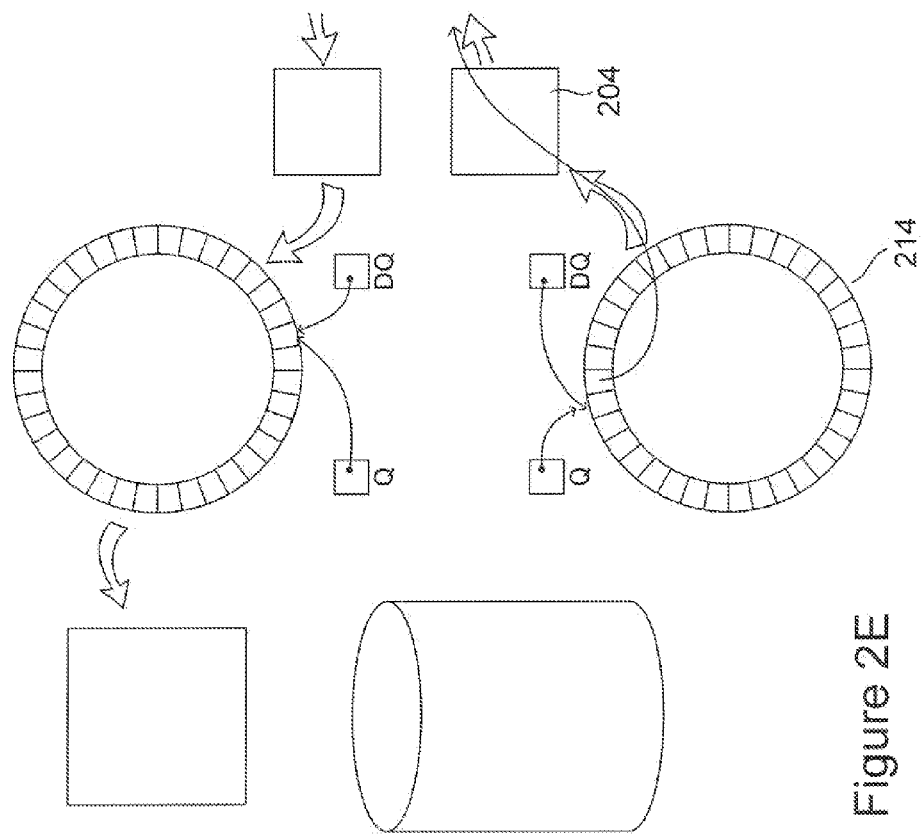
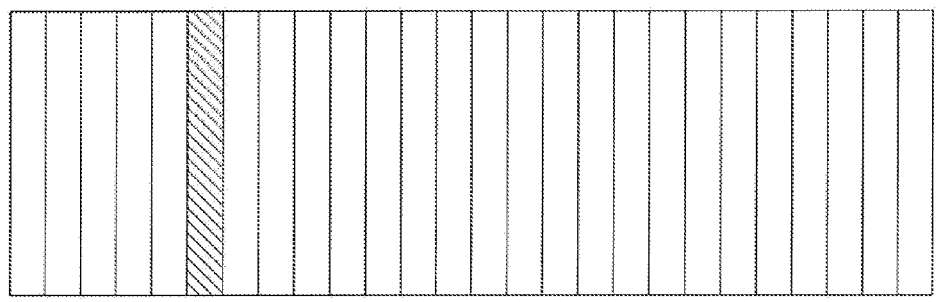
Figure 2E

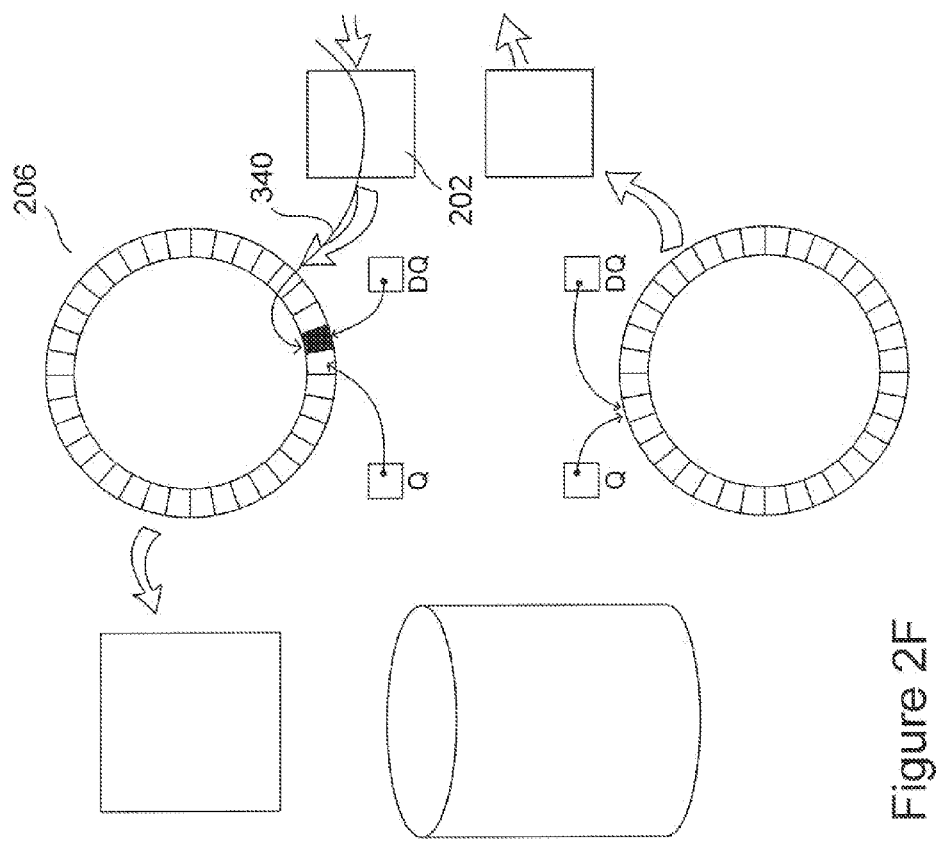
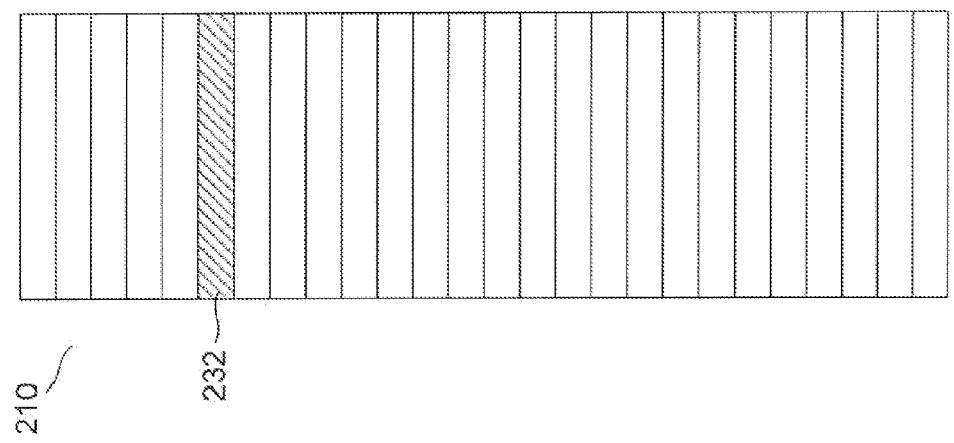
Figure 2F

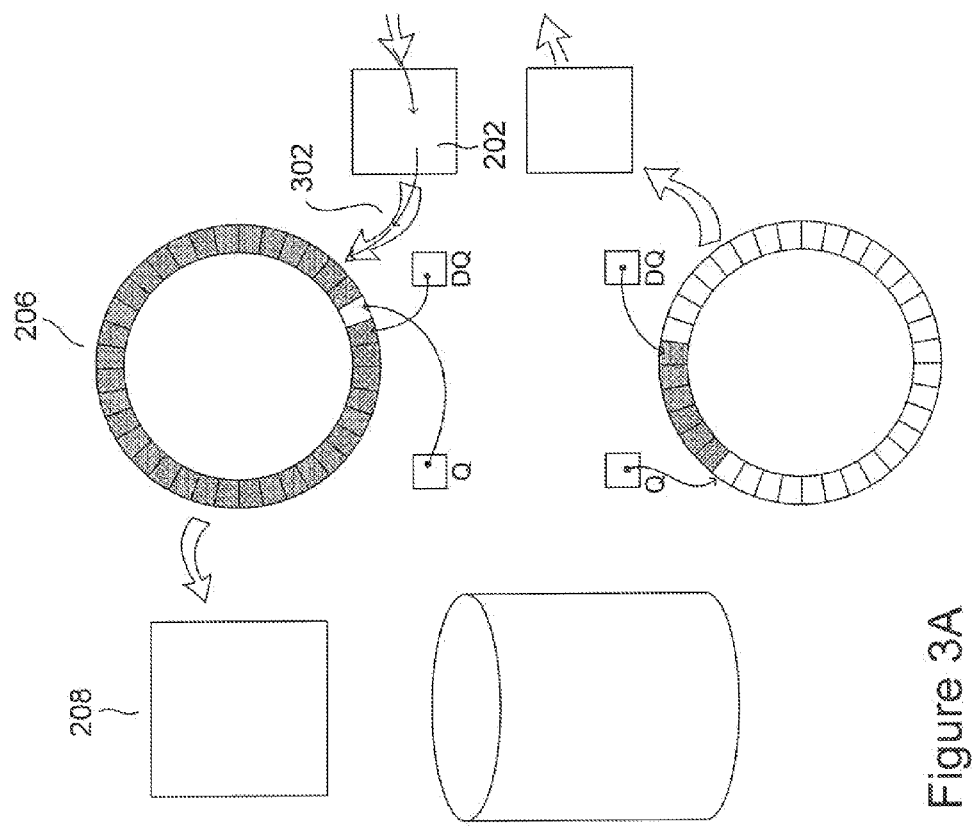
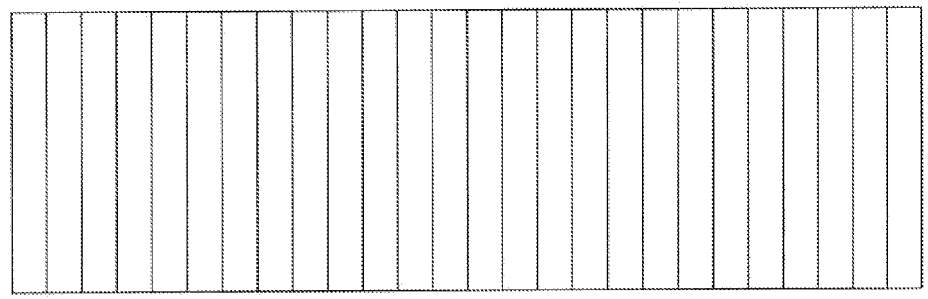
Figure 3A

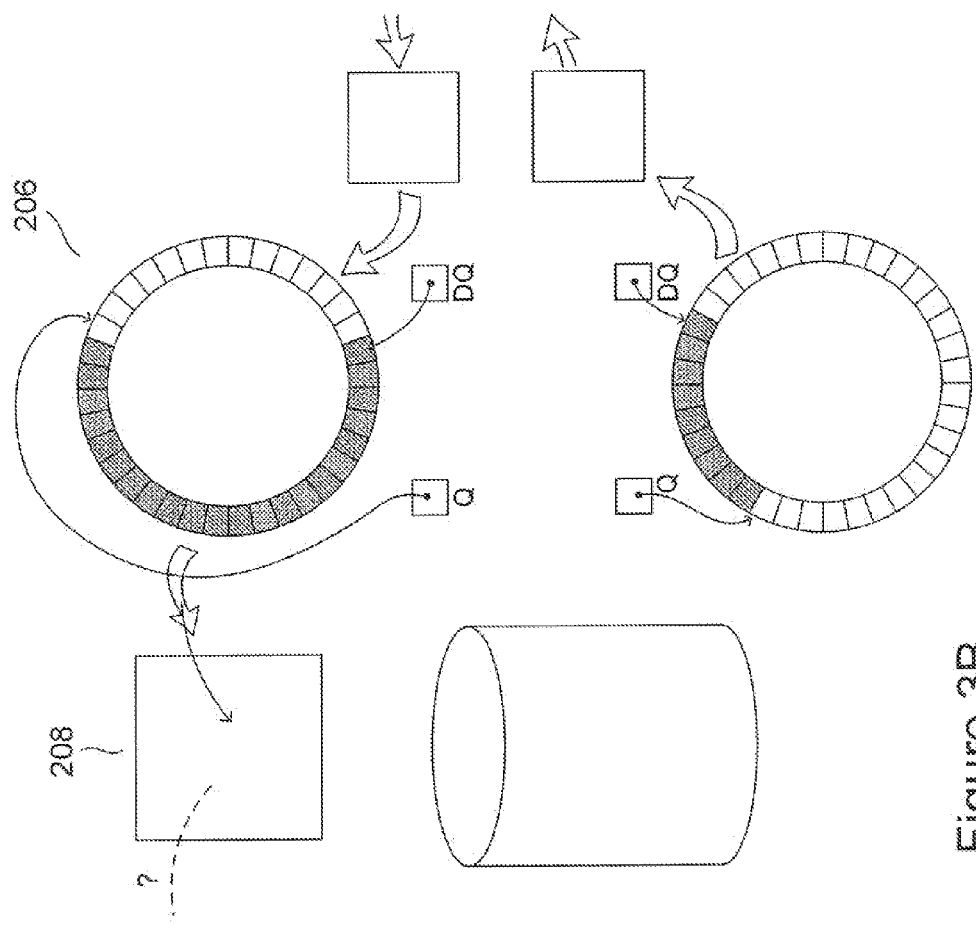
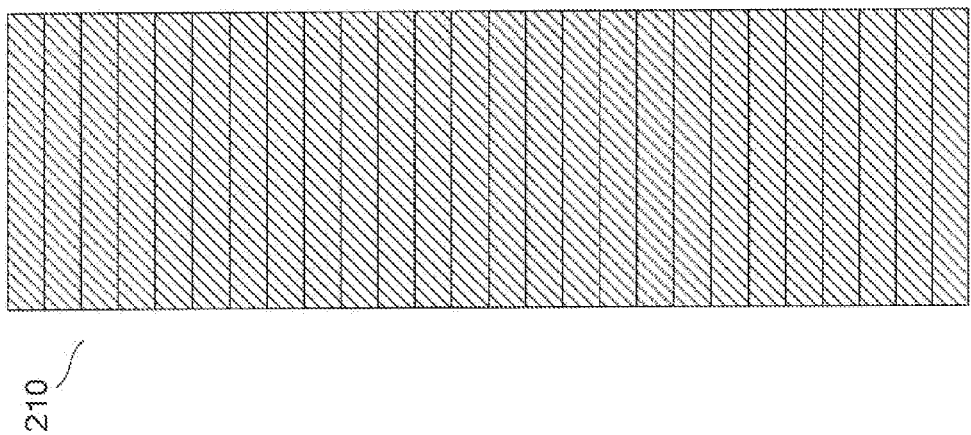
Figure 3B

| source ID | time | num | rate | blacklisted | bT |
|---|---|---|---|---|---|
| | | | | | |
| | | | | | |
| | | | | | |
| | | | | | |

Figure 8

METHOD AND SYSTEM FOR PROTECTING A COMPUTER SYSTEM FROM DENIAL-OF-SERVICE ATTACKS AND OTHER DELETERIOUS RESOURCE-DRAINING PHENOMENA RELATED TO COMMUNICATIONS

CROSS-REFERENCE TO RELATED APPLICATION

This application claims the benefit of Provisional Application No. 60/906,318, filed Mar. 9, 2007.

TECHNICAL FIELD

The present invention is related to security of computer systems, security of communications interfaces within computer systems and, in particular, to a multi-tiered approach to securing communications interfaces in order to prevent denial-of-service attacks, SYN-flood attacks, and other resource-draining phenomena related to communications interfaces.

BACKGROUND OF THE INVENTION

During the past 50 years, computer systems have evolved from isolated, stand-alone systems accessed through relatively slow, but relatively easily secured input/output systems ("I/O systems"), including printed-card decks and teletype consoles, to a world replete with ubiquitous personal computers, servers, mainframes, and enormous distributed computing systems that are highly interconnected through high-bandwidth electronic communications systems. A single computer may be potentially interconnected with tens, hundreds, thousands, or more external computer systems at any given time. The massive interconnection of computer systems has produced enormous benefits, not the least of which is interconnection of an enormous number of personal-computer users and organizations through the Internet. The Internet has, in turn, spawned entire new industries and now represents a mayor medium and framework for a wide variety of commercial activities. The extent to which evolution of the Internet has impacted human societies is apparent to anyone who, for example, was familiar with card catalogs and large reference sections in public libraries, now largely supplanted by Internet-based resources accessed through personal computers. Local and regional bookstores and music shops are disappearing as more and more people purchase books, CDs, software, and a variety of other consumer products from large Internet-based retailers.

Along with many advantages, massive interconnection of computer systems by electronic communications media has spawned a host of new problems, including a variety of different types of destructive communications-related activities, computer fraud, and even hijacking of large numbers of computer systems that then act together in a concerted fashion to attack and debilitate server computers and organizations, including launching denial-of-service attacks and SYN-flood attacks, to distribute spam email, and to distribute computer viruses and worms. Unfortunately, there are no easy solutions to many of these new problems. Electronic communications are very much a double-edged sword, providing great benefit and opportunities, but, at the same time, broadly exposing vulnerabilities in personal and computational security to malicious attackers as well as to unintentional lapses and malfunction of otherwise legitimate computational activities. Because of the varieties of communications-based threats and security vulnerabilities within computer systems, securing interconnected computers from intentional attack and inadvertent security lapses generally involve various layered, multi-tiered approaches and methods. Certain vulnerabilities will need to be contained and eliminated by increasing the security of individual computer systems, both at the hardware and at the operating-system levels. Other vulnerabilities may need to be addressed by constructing efficient and adaptive filters, checkpoints, and monitors at appropriate points in communications-related components of a computer system.

One type of security vulnerability to which current computer systems are exposed is a class of malicious or, in certain cases, unintentional patterns of communications requests that drain resources of a receiving computer to the extent that subsequent communications are severely degraded or completely disrupted. Examples of intentional efforts to exhaust communications-related resources within server computers include denial-of-service attacks and SYN-flood attacks, discussed further in subsequent sections of this document. Various strategies have been devised to inhibit denial-of-service and SYN-flood attacks, with various degrees of success. For critical computer systems, including domain-name servers and other foundation components of the Internet, better approaches are needed to thwart denial-of-service, SYN-flood, and other types of attacks that, when directed to Internet infrastructure, have the ability to degrade or completely disrupt Internet-based communications for significant periods of time, and, by doing so, disrupt commerce, critical information-provision services, and even compromise national defense and national security.

SUMMARY OF THE INVENTION

Embodiments of the present invention include a variety of different integrated, multi-tiered methods and systems for preventing various types of attacks on computer systems, including denial-of-service attacks and SYN-flood attacks. Components of these integrated methods and systems include probabilistic packet droppers, packet-rate throttles, resource controls, automated firewalls, and efficient connection-state-information storage in memory resources and connection-state-information distribution in order to prevent draining of sufficient communications-related resources within a computer system to seriously degrade or disable electronics communications components within the computer system.

BRIEF DESCRIPTION OF THE DRAWINGS

FIG. 1 shows a computational environment in which embodiments of the present invention are practiced.

FIGS. 2A-H illustrate, from a server's standpoint, reception and transmission of packets to a communications interface.

FIGS. 3A-B illustrate two types of resource exhaustion in a server computer that may lead to degradation or complete disruption of communications between the server computer and remote client computers.

FIG. 8 shows a table used by a firewall component of the multi-tiered communications-security system that represents one embodiment of the present invention.

DETAILED DESCRIPTION OF THE INVENTION

Figure 2C:
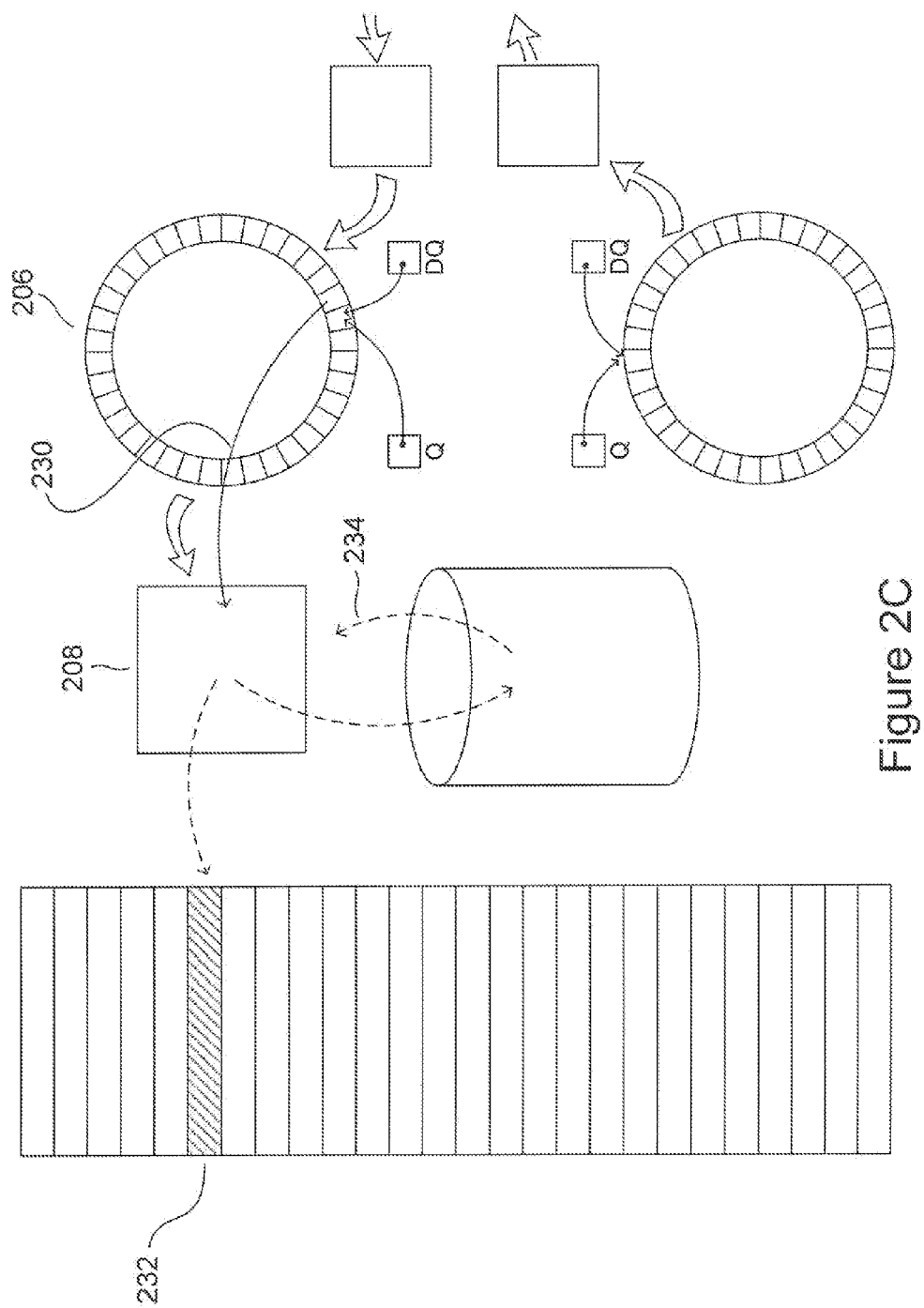

The present invention is related to security, particularly communications security in servers, including domain-name servers, that communicate with remote client computers. While the integrated approach to security, to which particular described embodiments of the present invention are directed, is motivated by particular types of threats to particular types of electronic communications, the approach is reasonably general, and applicable to a wide variety of different types of communications media and computer systems. Therefore, the present invention is described, below, in general terms, without delving into particular aspects of each of the many types of communications interfaces and components that can be secured using the multi-tiered approach of the present invention. The present invention is applicable to all computer systems that communicate with remote computers through electronic communications media, and thus, in the current document, the term "server" is not used in a restrictive sense, but is intended to indicate a computer system of which requests are made by external, remote computers. A server may, for example, comprise many individual computer systems or server modules within a multi-server enclosure.

FIG. 1 shows a computational environment in which embodiments of the present invention are practiced. In this environment, a server computer 102 is interconnected through one or more communications media to a large number of remote client computers, such as client computer 104. The communications connections, represented in FIG. 1 by parallel, bi-directional arrows, such as communications connection 106 between the server 102 and remote client computer 104, are dynamic, generally created on the initiative of the client computers in order to request and receive data from, or transmit data to, the server computer, and then terminated when one or more requests are fulfilled by the server computer. The communications connections shown in FIG. 1 are logical. The actual hardware and software systems and physical links through which communications connections are established made may be extremely complex, and involve a large number of intermediary computer systems and networks.

In general, the total number of communications connections between remote client computers and a particular server computer is a dynamic, rapidly changing value, and may vary quickly over very large ranges, from a handful of communications connections to tens of thousands or more. The average duration of connections is generally unpredictable, depending on the nature of the server, the nature of the information transactions requested by client computers, and on the nature of the particular physical and logical communications medium through which the connections are made and maintained. For many communications media, information is exchanged in relatively small, discrete messages, or packets. The physical hardware and higher-level hardware and software-implemented protocol layers are responsible for dissembling a large quantity of data for transfer into packets, on the transmission side, and for reassembling the packets into the large quantity of data on the receiving side of a communications-based transaction. The hardware and software layers of the communications medium are also responsible for ensuring timely and reliable delivery of packets, sequencing the packets, and securing data within the packets, among other things.

FIGS. 2A-H illustrate, from a server's standpoint, reception and transmission of packets to a communications interface. FIGS. 2A-H employ illustration conventions that are also used in subsequent figures. The communications-medium-related components shown in FIGS. 2A-H are generalized, for purposes of illustration, and omit much detail unneeded for a description of the current invention. These figures show internal server components related to one particular communications-medium interface. A given server may contain a large number of such components in order to interface to a large number of different communications media.

The communications-medium components shown in FIG. 2A include a receiving component 202 and transmission component 204 of a communications-medium port, a first-in-first-out ("FIFO") buffer 206 into which received packets are queued, a processing component 208 that processes packets and that eventually constructs response packets for remote computers, memory resources 210 devoted to storing information related to the state of connections, additional data storage, both in electronic memory and in mass-storage devices 212, that stores information related to connections as well as information received from, and processed in order to return data to, remote client computers, and an output FIFO queue 214, onto which packets are queued for transmission to client computers via the transmission component 204 of the communications-medium port. In the current discussion, the term "packet" is used interchangeably with the term "message," although, under many communications protocols, a message is a higher-level construct comprising one or more lower-level packets. The input FIFO queue 206 and output FIFO queue 214 are each associated with a DQ pointer 216 and 218, respectively, and a Q pointer, 220 and 222, respectively. The Q pointer is used to reference a next empty slot for input of a packet onto the FIFO queue, and the DQ pointer is used to reference the next queued packet for removal from the FIFO queue. The DQ and Q pointers are incremented, by modulo n arithmetic, where n is the number of slots in the queue, in order to logically circularize a linear sequence of queue slots to form a familiar, logical circular queue. In FIG. 2A, both the input FIFO queue 206 and output FIFO queue 214 are empty, a condition characterized by the DQ and Q pointers of the FIFO queues each pointing to the same, empty slot.

FIGS. 2B-E illustrate a simple packet exchange between a remote client computer and the server computer. In FIG. 2B, a packet 228 is received 226 from a client computer, or source, and placed into the input FIFO queue. In FIG. 2C, the processing component 208 detects the newly queued packet and retrieves 230 the newly queued packet from the input FIFO queue 206. The processing component may create and store state information 232 in the memory resource 210 when the newly arrived packet is an initial packet of a communications connection, or may subsequently access stored state information in order to process subsequent packets sent as part of a communications connection. In addition, the processing component 208 may access 234 additional information from memory or mass storage in order to process the packet. After processing the packet, as shown in FIG. 2D, the processing component 208 generally prepares a response packet and queues 236 the response packet 238 into the output FIFO queue 214. In FIG. 2E, the response packet is extracted from the output FIFO queue 214 by the transmission component 204 and transmitted to a remote client computer.

Figure 2G:
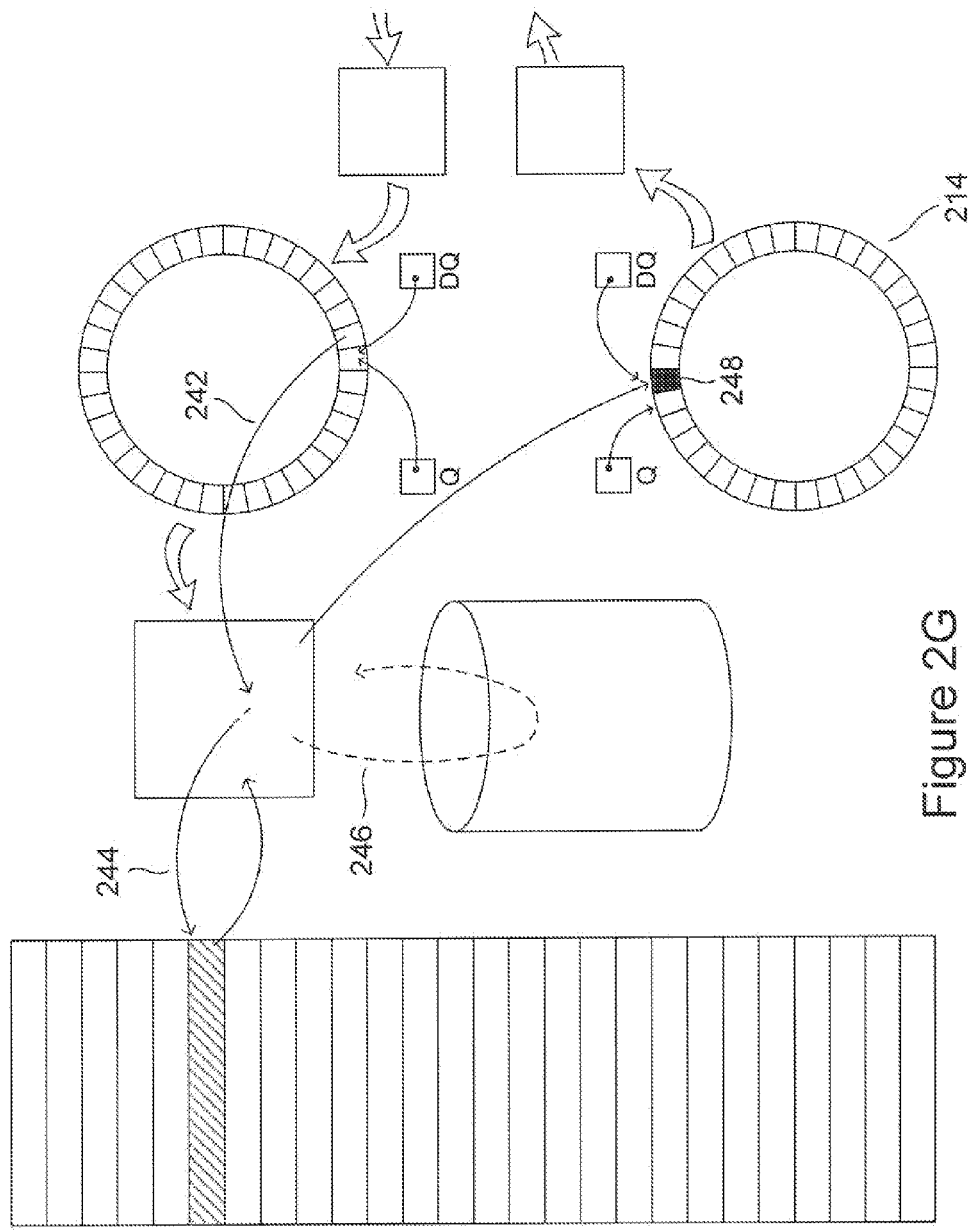
Figure 2H:
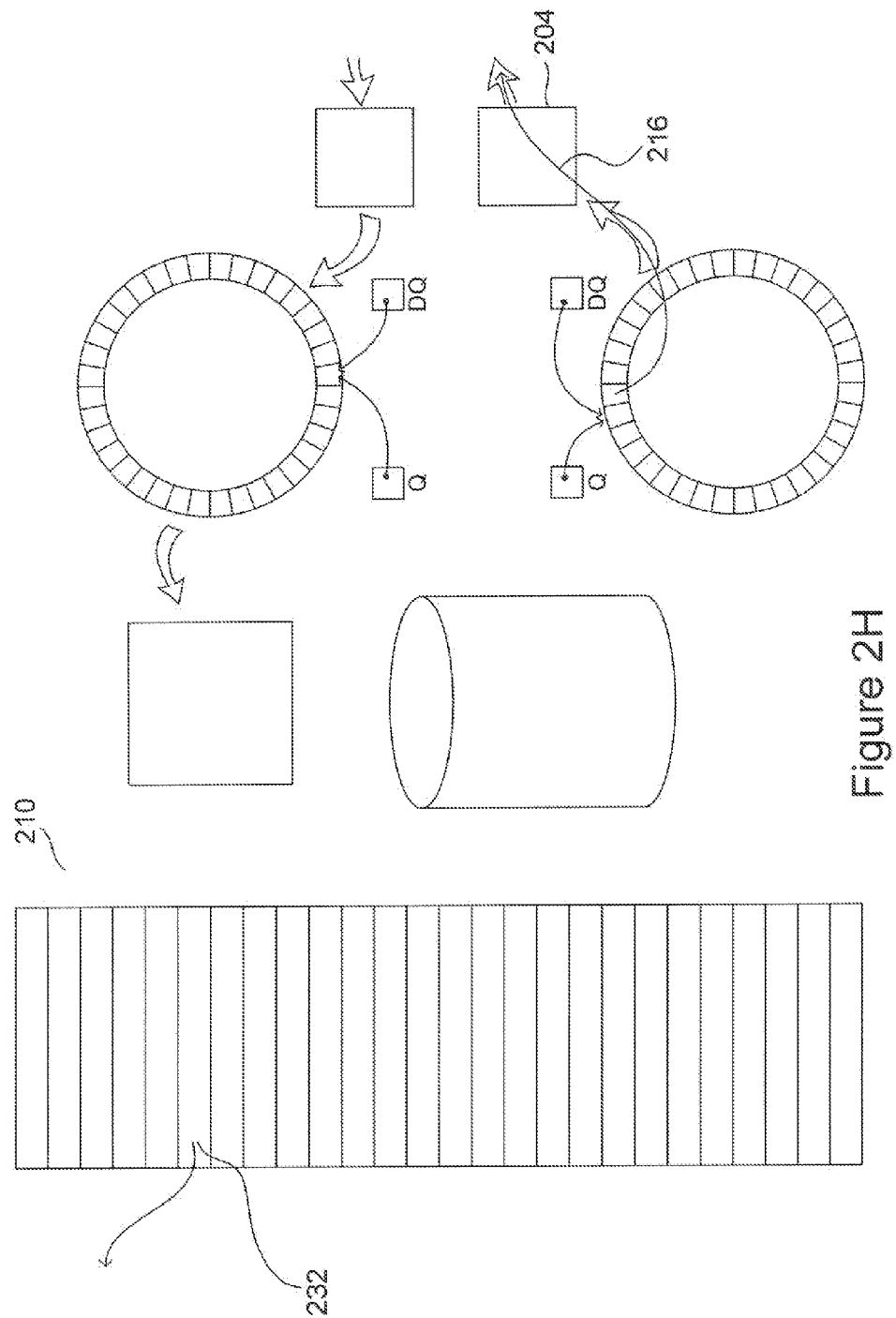

FIGS. 2F-H illustrate a final packet exchange of a communications connection. In FIG. 2F, a communications connection has been previously established, and state information 232 for the connection has been stored in the memory component 210, in a previous packet exchange such as that shown in FIGS. 2B-E. Once the connection is established, packets, or messages, are received from the client computer and responded to by the server computer in a sequence of exchanges according to a particular type of client/server transaction and communications protocol. Finally, as shown in FIG. 2F, the client computer sends a final connection-termination message to the server computer which is received 240 by the receiving component 202 and placed into the input FIFO queue 206. In FIG. 2G, the processing component retrieves 242 the packet, accesses 244 state information describing the connection, and optionally accesses additional information 246 in order to properly process the packet and construct a final, acknowledgement message 248 that the processing component queues to the output transmission queue 214. As shown in FIG. 2H, the final acknowledgement message is then de-queued and transmitted to the client computer 216 by the transmission component 204 and the memory resource location containing the state information 232 is freed.

To summarize, client/server transactions generally involve the sending of packets, or messages, by the client computer to the server computer and, for each packet sent by the client computer to the server computer, a response packet sent from the server computer back to the client computer. When a connection is initialized, the state describing the connection is stored in a memory resource, and when the connection terminates, following one or more data-transfer transaction transactions, the state information is removed from the memory resource. Of course, the state information may not be immediately overwritten or cleared, but may persist in the memory resource until the word or words of memory occupied by the state information is subsequently overwritten during establishment of a subsequent communications connection.

FIGS. 2A-H illustrate single-packet exchanges between the server and the client computer. However, at any given instant in time, the server may be receiving packets from, and transmitting packets to, many hundreds, thousands, tens of thousands, or more client computers. Thus, the input FIFO queue may contain tens of thousands or more slots, many of which are occupied by received packets waiting for processing. State information describing all of the current communications connections may occupy a significant portion of the memory resource for storing state information. Finally, a significant fraction of the total processing-component bandwidth may be devoted to processing received packets and generating response packets for transmission back to client computers.

FIGS. 3A-B illustrate two types of resource exhaustion in a server computer that may lead to degradation or complete disruption of communications between the server computer and remote client computers. As shown in FIG. 3A, when packets are received 302 by the receiving component 202 at a sufficiently high rate, the input FIFO queue 206 may be completely filled, because the processing component 208 cannot process received packets quickly enough to free up FIFO-queue slots queuing additional received packets. In this case, because the transmission component 202 has no place to store received packets, the transmission component simply ignores, or drops, incoming packets until space is available on the input queue. This situation can result from a denial-of-service ("DoS") attack in which one or more remote computers transmits a flood of connection-request or other packets to a particular server computer. Even though the server computer may be able to continue to process received packets, because of the much greater number of incoming malicious packets than legitimate packets, the chance that a legitimate packet will be received and processed by the server, during the DoS attack, becomes quite small, and legitimate clients are therefore denied access to the server computer.

FIG. 3B illustrates a second type of resource exhaustion. As shown in FIG. 3B, although there remain many empty slots in the input FIFO queue 206 for reception of additional packets, the memory resource 210 is completely filled with state information, and thus the processing component 208, upon dequeuing yet another connection-request packet from the input FIFO queue, cannot create and store state information in order to process the connection request. In this case, the server generally ends up denying the connection request. This situation may result from a SYN-flood attack in which SYN packets of the three-phase TCP-protocol connection-establishment sequence are sent in large numbers to a server computer in order to exhaust the memory resource and prevent the server from accepting subsequent connections. These are but two examples of a variety of different types of resource-exhaustion conditions that can arise in a server computer due to reception of a large number of messages or packets from external computers at a higher rate than the server computer can process the received packets or connection requests, or because of malicious connection requests that result in stored state information accumulating in, and exhausting, a state-information-storage resource.

Figure 4A:
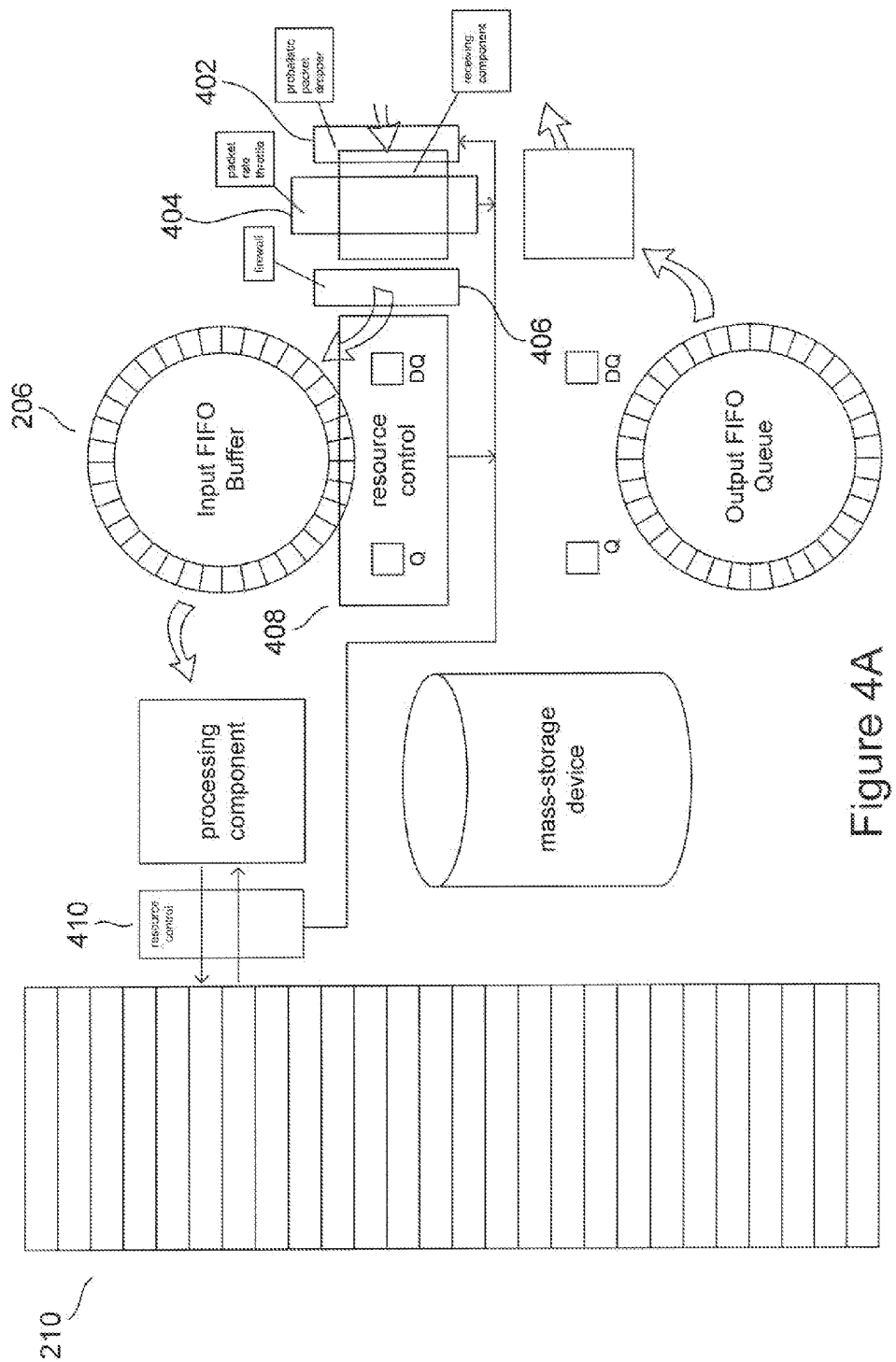
FIGS. 4A-B illustrate components of a multi-tiered communications-security system incorporated within a server computer in order to prevent the resource-exhaustion-related communications failures illustrated in FIGS. 3A-B according to one embodiment of the present invention.
Figure 4B:
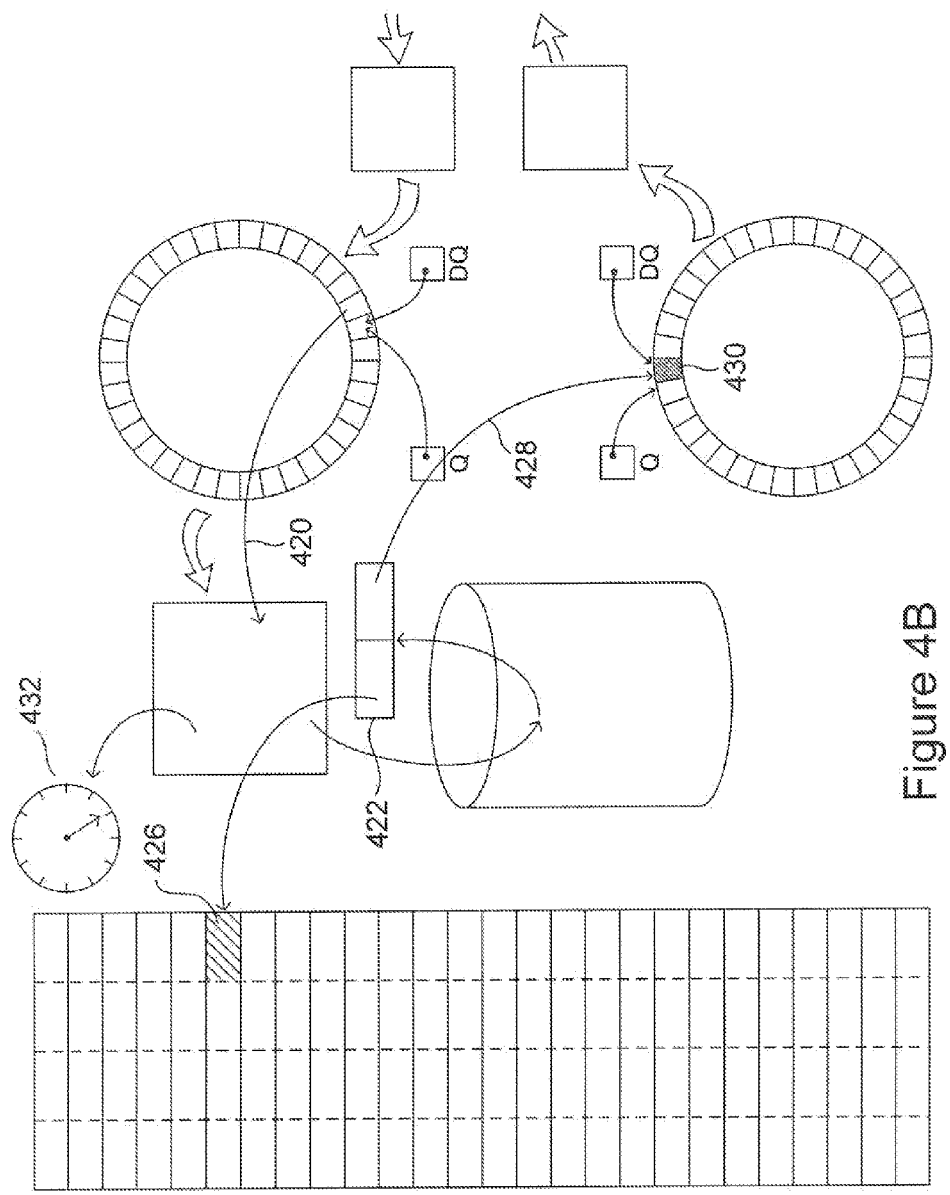

FIGS. 4A-B illustrate components of a multi-tiered communications-security system incorporated within a server computer in order to prevent the resource-exhaustion-related communications failures illustrated in FIGS. 3A-B according to one embodiment of the present invention. It should be noted that the embodiment of the present invention illustrated in FIGS. 4A-B is but one of many different possible embodiments of a multi-tiered communications-security system within a server computer or distributed server computer according to the present invention.

In FIG. 4A, the communications-medium-related components of a server computer are shown in the fashion of FIGS. 2A-H and 3A-B. In addition, a number of new components are shown. These new components include a probabilistic packet dropper 402, a packet-rate throttle 404, an automatic firewall 406, and two instances of a resource-control component 408 and 410. The probabilistic packet dropper can be activated by the packet-rate throttle or either or both of the two resource-control components 408 and 410. The probabilistic packet dropper, in response to incipient resource exhaustion, selects, at random, a fraction of incoming packets and drops those packets, rather than passing the packets on for queuing to the input FIFO queue 206. The packet-rate throttle 404 detects rates of incoming packets higher than can be processed by the server, and activates the probabilistic packet dropper to throttle the general packet-reception rate to, or below, a maximum reception rate. The automatic firewall 406 operates to throttle packet reception from individual client computers when the individual client computers exceed a maximum packet-transmission rate. The first resource control 408 detects incipient exhaustion of the input FIFO queue 206 and activates the probabilistic packet dropper 402 in order to prevent exhaustion of the input FIFO queue. The second resource control 410 detects incipient exhaustion of the memory resource 210 and activates the probabilistic packet dropper 402 to prevent exhaustion of the memory resource.

FIG. 4B illustrates a connection-request-handling method incorporated into the server computer to prevent memory-resource exhaustion. When a next SYN packet is received 420, representing a request to establish a TCP connection with the server, the state information 422 required to be stored during the TCP three-phase connection-establishment procedure is minimized, with one portion 424 of the state information stored in the memory resource 426 and another portion 428 of the state information scrambled or encrypted and returned to the client computer, which sent the SYN request, in a SYN-ACK response message 430. In addition, both the state information stored in the memory resource 426 and information used to scramble or encrypt the state information returned to the requesting client computer 428 are given expiration times, via a timing mechanism 432, so that, should the client computer that sent the SYN request fail to respond to the SYN-ACK response to the SYN request in a timely fashion, the state information and scrambling or encryption information are effectively removed from the server computer, terminating the incipient connection quickly, rather than allowing unneeded state information related to the incipient connection to persist in the server computer. This method, by reducing the amount of state information saved within the server computer and quickly terminating pending connections, greatly increases the number of connection requests for which state information can be stored in a finite memory resource, and frustrates those mounting SYN-flood attacks by quickly terminating incipient connections, and thus preventing malicious remote entities from attempting to prolong or fraudulently complete three-phase connection-establishment transactions.

Figure 5:
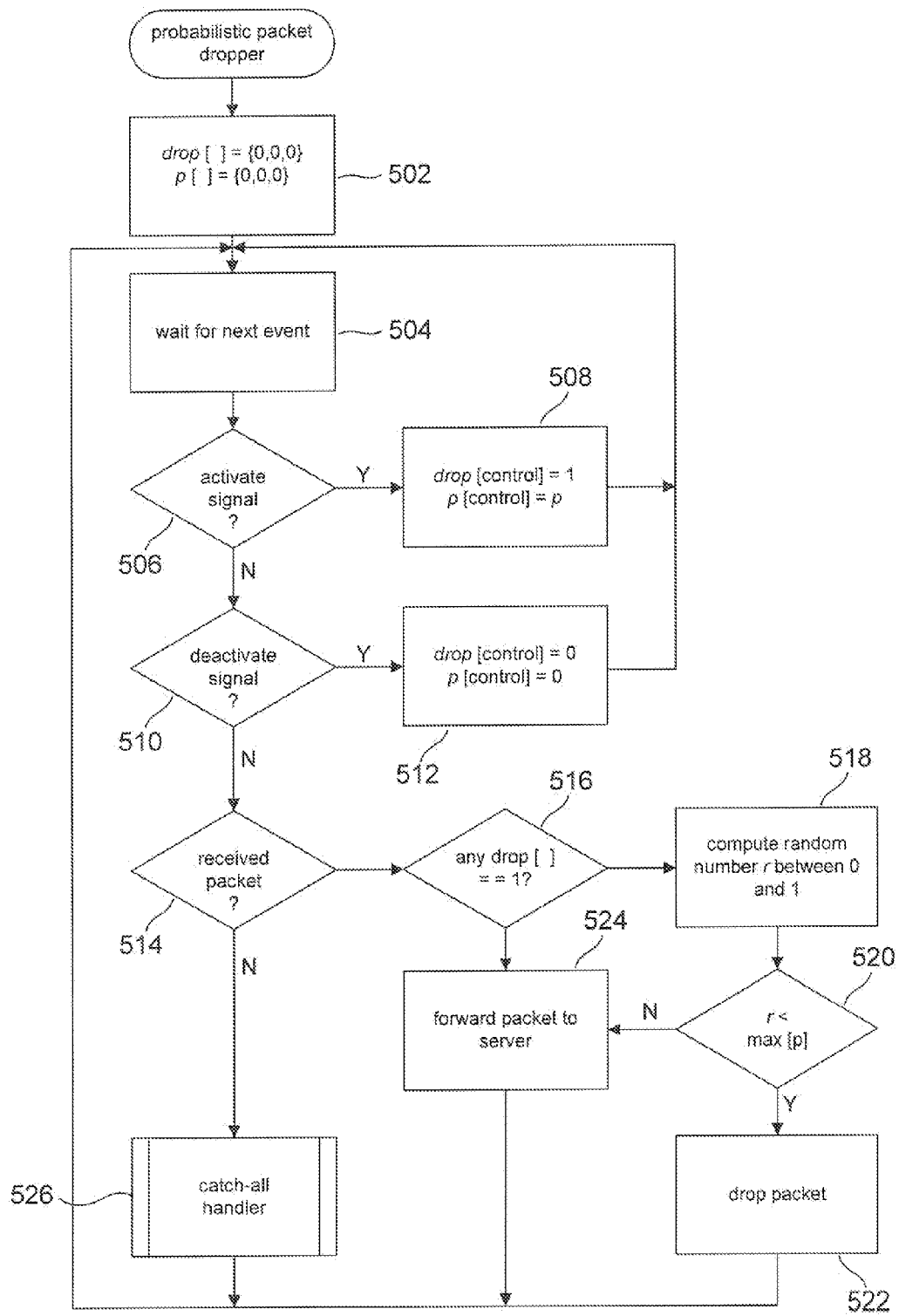
FIG. 5 provides a control-flow diagram that illustrates one embodiment of a probabilistic packet dropper according to one embodiment of the present invention.

FIG. 5 provides a control-flow diagram that illustrates one embodiment of a probabilistic packet dropper according to one embodiment of the present invention. The probabilistic packet dropper (402 in FIG. 4A) drops a fraction of received packets when activated to do so by the packet-rate throttle (404 in FIG. 4A), the first resource control (408 in FIG. 4A), and/or the second resource control (410 in FIG. 4A). The probabilistic packet dropper employs two local-variable arrays drop and p. The local-array drop contains three Boolean values indicating whether or not the probabilistic packet dropper has been activated by each of the three components 404, 408, and 410 discussed in FIG. 4A. These two arrays are initialized, in an initialization step 502, to contain Boolean FALSE, or 0 values, in the case of the drop array, and all 0 values in the case of the p array. Then, in step 504, the probabilistic packet dropper waits for, and handles any events that arise during system operation. When a next event is an activate signal, as determined in step 506, the corresponding element in the drop array is set to Boolean TRUE and the corresponding element in the p array is set to a fractional value transmitted from the activating component, in step 508. When the received signal is a deactivate signal, as determined in step 510, the corresponding elements in the drop and p arrays are cleared, in step 512. When the event is reception of a packet, as determined in step 514, then if the probabilistic packet dropper has been activated, as determined in step 516, a random number r between 0 and 1 is computed, in step 518 and, when r is less than the maximum value stored in the p array, as determined in step 520, the received packet is dropped, in step 522. When r is greater than, or equal to, the maximum element in the p array, the packet is forwarded to the server, in step 524. Any other events are handled by a catch-all handler in step 526. Thus, the probabilistic packet dropper continues to execute the event-handling loop of steps 504 and subsequent steps while the server computer operates and continues to receive packets. The elements of the p array contain an indication of the fraction of incoming packets to be probabilistically dropped. The probabilistic packet dropper drops the largest fraction of packets for which it has been activated to drop by any of the components 404, 408, and 410, shown in FIG. 4A.

Figure 6:
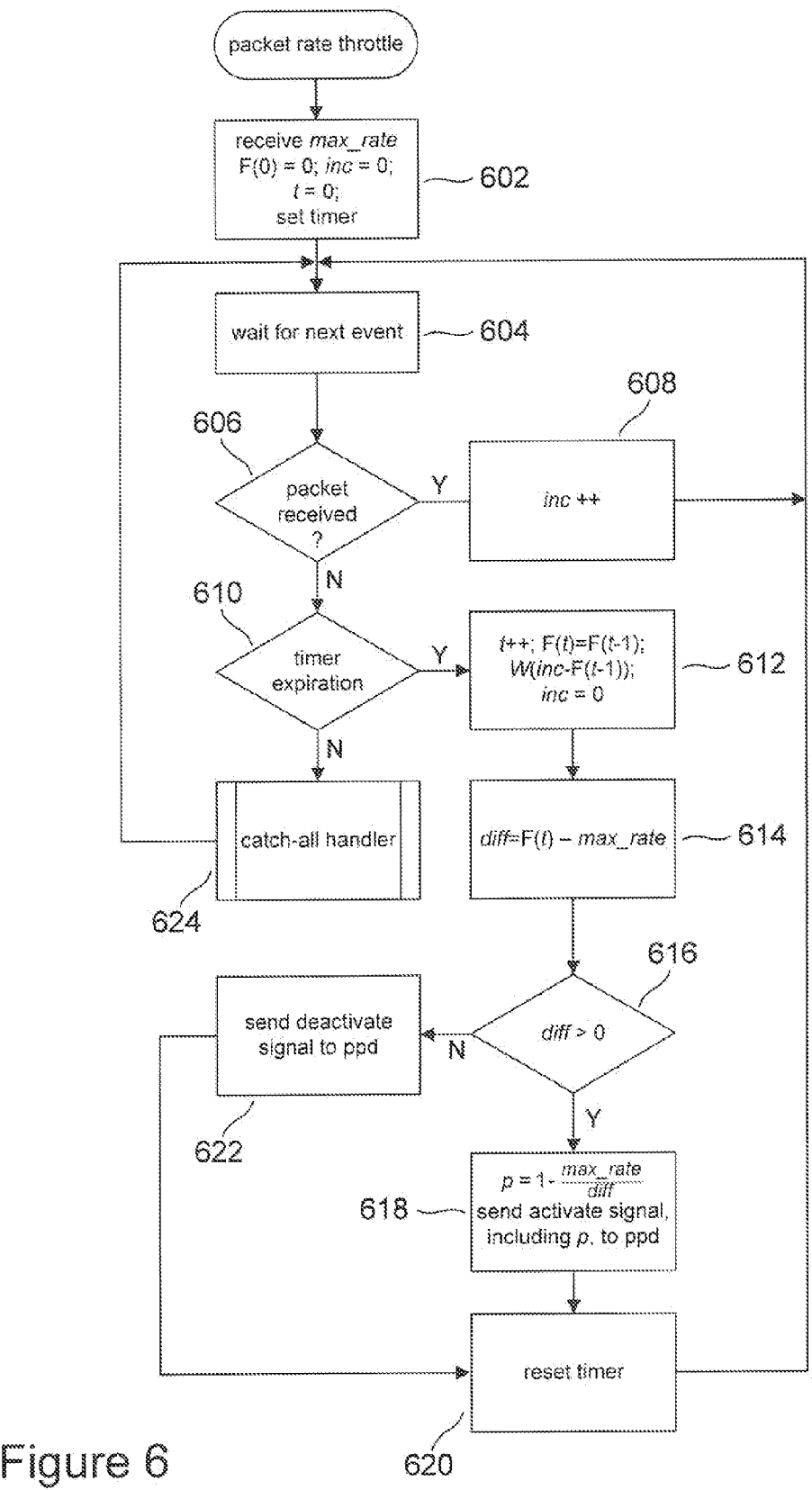
FIG. 6 provides a control-flow diagram for one embodiment of a packet-rate throttle according to one embodiment of the present invention.

FIG. 6 provides a control-flow diagram for one embodiment of a packet-rate throttle according to one embodiment of the present invention. The packet-rate throttle (404 in FIG. 4A) activates the probabilistic packet dropper whenever the rate of incoming packets exceeds a maximum rate. In an initialization step 602, the packet-rate throttle receives the maximum packet rate max_rate, sets an interval timer, sets a current-time variable t, sets a variable inc to 0, and initializes an exponential running-average function F by: $F(0)=0$. Then, in step 604, the packet-rate throttle waits for a next event to occur, and handles that event in subsequent steps. Thus, the packet-rate throttle, like the probabilistic packet dropper, operates as a continuous event-handling loop. When a next event is reception of a packet, as determined in step 606, then the variable inc is incremented, in step 608. When the next event is a timer expiration, as determined in step 610, then the variable t is incremented, the current exponential running average $F(t)$ is computed as $F(t)=F(t-1)+W(inc-F(t-1))$, where W is a weighting function, and the variable inc is then set to 0, in step 612. A difference diff is computed as the current exponential running average minus the maximum allowed packet reception rate, max_rate, in step 614. When the difference is greater than 0, as determined in step 616, then the packet-rate throttle sends an activation signal to the probabilistic packet dropper in step 618 and resets the timer in step 620. Otherwise, the packet-rate throttle sends a deactivate message to the probabilistic packet dropper, in step 622. A catch-all handler handles any other types of events that occur, in step 624. The packet-rate throttle computes the fraction of packets to drop, p, as $$1 - \frac{max\_rate}{diff}$$

in step 618. Thus, the packet-rate throttle continuously monitors incoming packets and, when the rate at which packets are received exceeds a maximum rate, activates the probabilistic packet dropper to begin dropping packets until the packet-reception rate falls below the maximum rate or packet reception.

Figure 7:
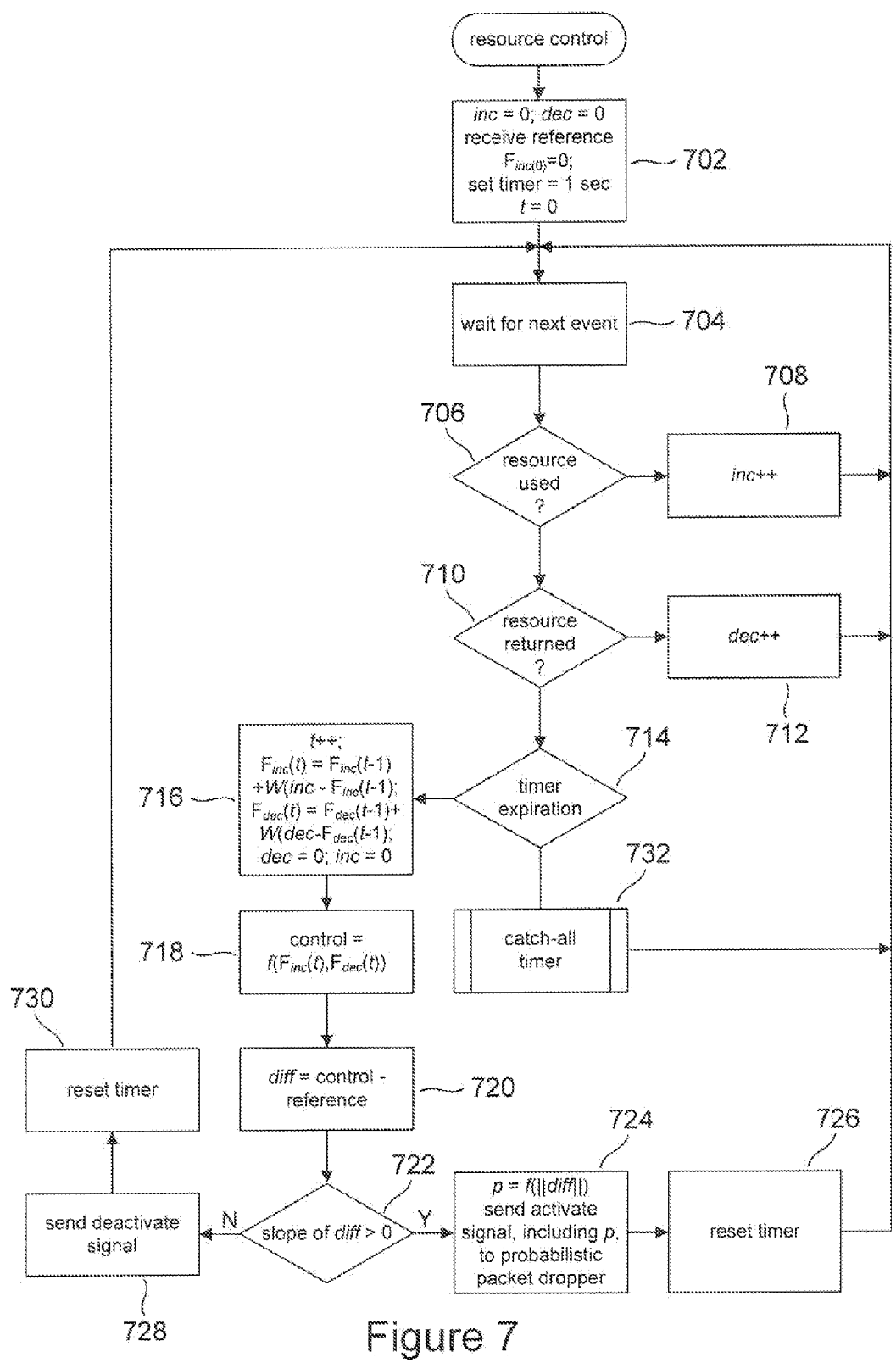
FIG. 7 provides a control-flow diagram for a resource control according to one embodiment of the present invention.

FIG. 7 provides a control-flow diagram for a resource control according to one embodiment of the present invention. Resource controls can be incorporated into either or both of the input FIFO queue 206 and memory resource 210, as shown in FIG. 4A. Resource controls may be incorporated into other resource components of a server system, as well. In an initial step 702, the resource control initializes two exponential running-average functions $F_{inc}$ and $F_{dec}$, receives a reference value or vector, sets local variables inc and dec to 0, sets an interval timer, and sets a time variable t to 0. Then, the resource control waits for a next event, in step 704, and handles the event in subsequent steps. Like the packet-rate throttle and probabilistic packet dropper, the resource control essentially continuously executes an event-handler loop while the server operates and receives packets from external computer systems. When the next event is use of a resource, such as queuing a packet to the input FIFO queue 206 or placing status into the memory resource 210, as determined in step 706, then the variable inc is incremented, in step 708. Otherwise, when the event is return of a resource, or deallocation of a resource, such as freeing of the portion of the resource storing a particular status value or de-queuing of an entry from the input FIFO queue, as determined in step 710, then the variable dec is incremented, in step 712. When the event is a timer expiration, as determined in step 714, then the time variable t is incremented, the current running averages $F_{inc}(t)$ and $F_{dec}(t)$ are computed as: $F_{inc}(t)=F_{inc}(t-1)+W(inc-F_{inc}(t-1)$ and $F_{dec}(t)=F_{dec}(t)=F_{dec}(t-1)+W(dec-F_{dec}(t-1))$, and the variables dec and inc are cleared, in step 716. Then, in step 718, a vector or value control is computed as a function of the current exponential running averages $F_{inc}$ and $F_{dec}$. A difference value or vector diff is computed as the difference between the control and the reference value or vector, in step 720. If the slope of the difference vector is positive, as determined in step 722, or the difference the control and reference values is positive, then, in step 724, the resource control sends an activate message to the probabilistic packet dropper, computing the fraction of packets to drop, p, as a function of the magnitude of the difference vector or value, and the timer is reset in step 726. When the slope of the difference vector is not positive, of the difference between the control and reference values is not positive, then a deactivate message is sent to the probabilistic packet dropper, in step 728, and the timer is reset in step 730. A catch-all timer is used, in step 732, to handle any other types of events. Thus, the resource control monitors resource usage by monitoring the average numbers of allocations versus deallocations in order to detect an incipient exhaustion condition, prior to resource exhaustion, in order to activate the probabilistic packet dropper.

The reference and control may be vectors corresponding to centroids of probability distributions, or may, instead, be scalar values corresponding to ratios of allocations to deallocations for the resource. In either case, or in alternative schemes, the reference indicates an expected resource usage and, when the control value corresponding to a most recently measured, actual resource usage differs from the reference in a direction indicating incipient resource exhaustion, packet reception is throttled.

Figure 8:
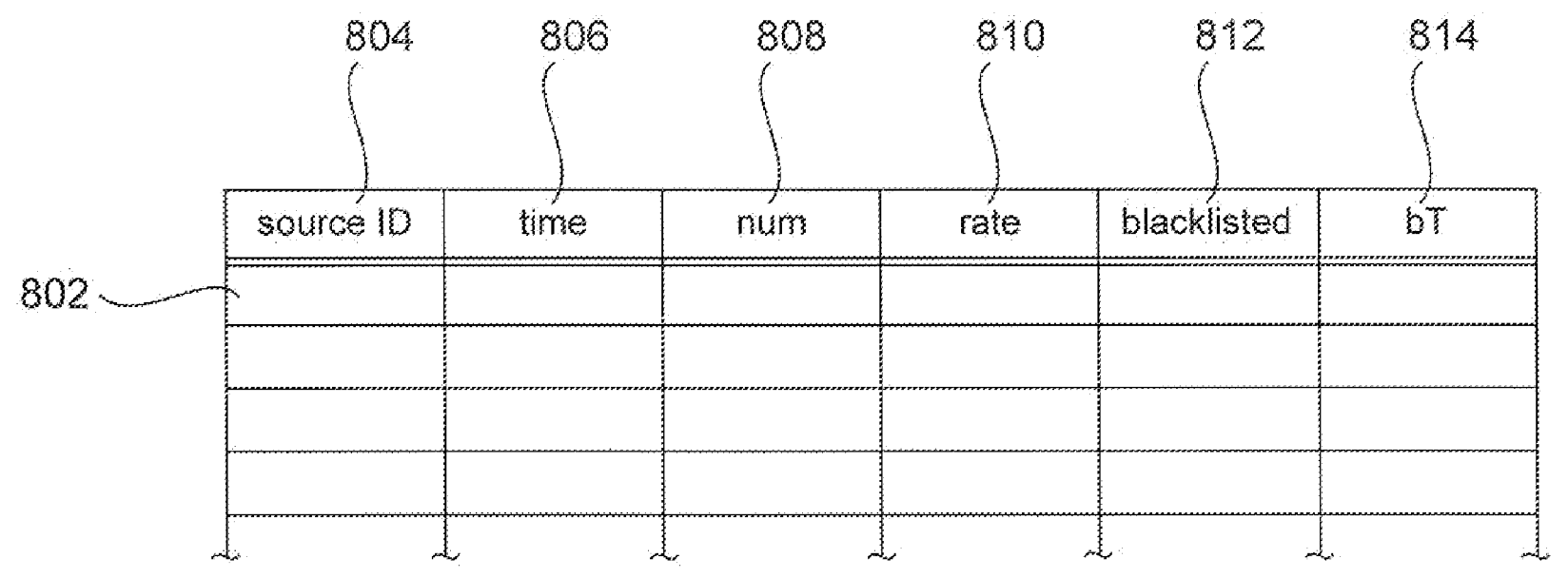

FIG. 8 shows a table used by a firewall component of the multi-tiered communications-security system that represents one embodiment of the present invention. Each entry in the table, where an entry is a row, such as row 802, is indexed by a source ID-field value 804 corresponding to the address of a remote client computer that has sent a packet to the server computer. Thus, each entry in the table corresponds to a remote client computer. Each table entry includes the additional fields: (1) time 806, the time that a last packet was received from the client computer, or source; (2) num 808, a count of the number of packets received from the source during a current interval; (3) rate 810, the current maximum rate for packet reception by the source; (4) blacklisted 812, a Boolean value indicating whether or not the source is currently blacklisted; and (5) bT 814, a blacklist or graylist expiration time for the source (graylisting is explained below).

Figure 9A:
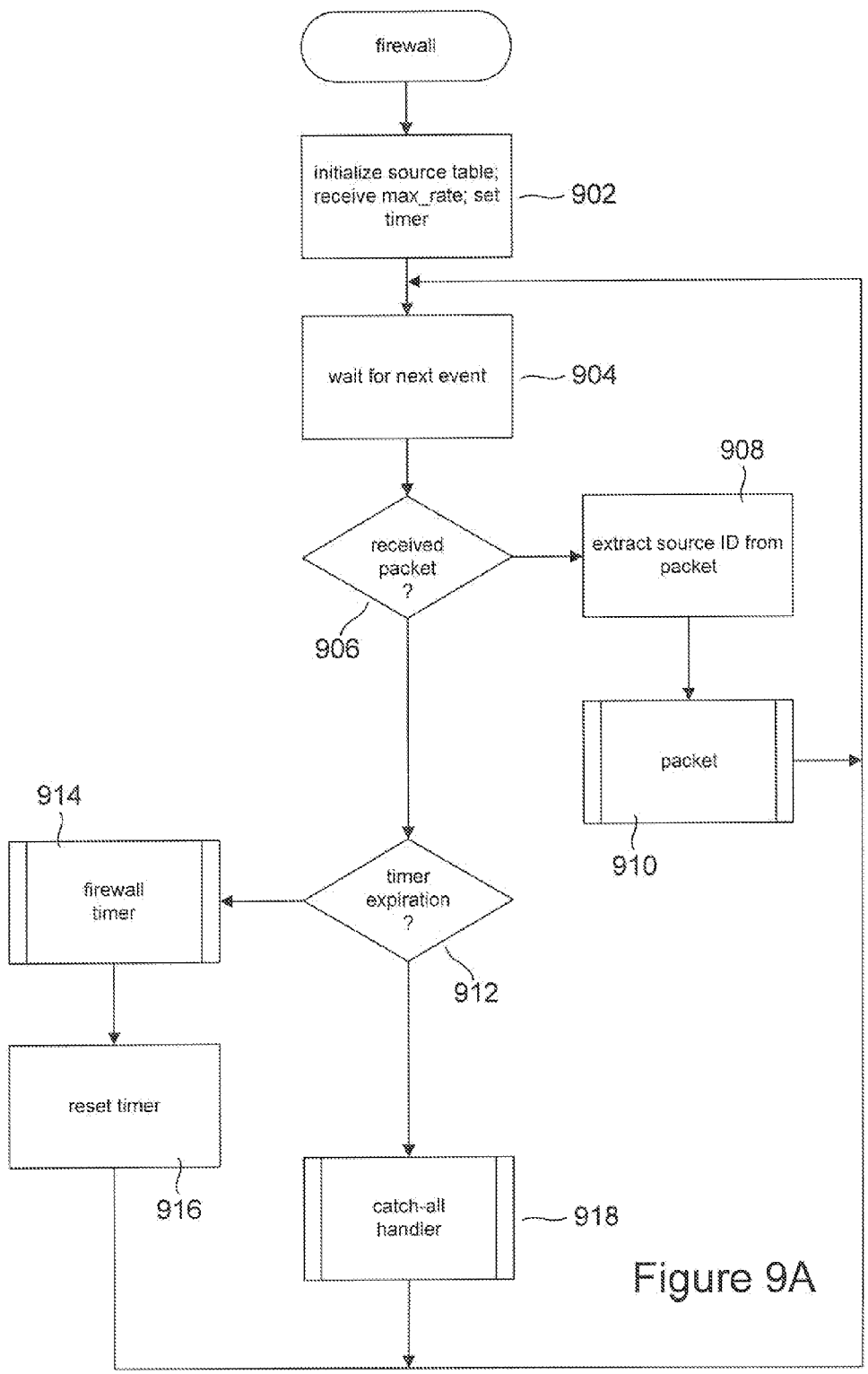
FIGS. 9A-E provide control-flow diagrams for an automatic firewall component of a multi-tiered communications-security system that represents one embodiment of the present invention.

FIGS. 9A-E provide control-flow diagrams for an automatic firewall component of a multi-tiered communications-security system that represents one embodiment of the present invention. FIG. 9A is a high-level control-flow diagram for the automatic firewall component. In step 902, the source table, described with reference to FIG. 8, above, is initialized to a max_rate, which represents the maximum packet-transmission rate allowed for any given source, and a timer is set. Then, in step 904, the automatic firewall waits for a next event to occur, and handles any next event in subsequent steps. When the next event is a received packet, as determined in step 906, the source ID or address of the client computer that sent the packet is extracted from the packet, in step 908, and the routine "packet" is called in step 910. Otherwise, when the event is a timer expiration, as determined in step 912, then the routine "firewall timer" is called, in step 914, and the timer is reset, in step 916. A catch-all handler handles any other events that occur, in step 918.

Figure 9B:
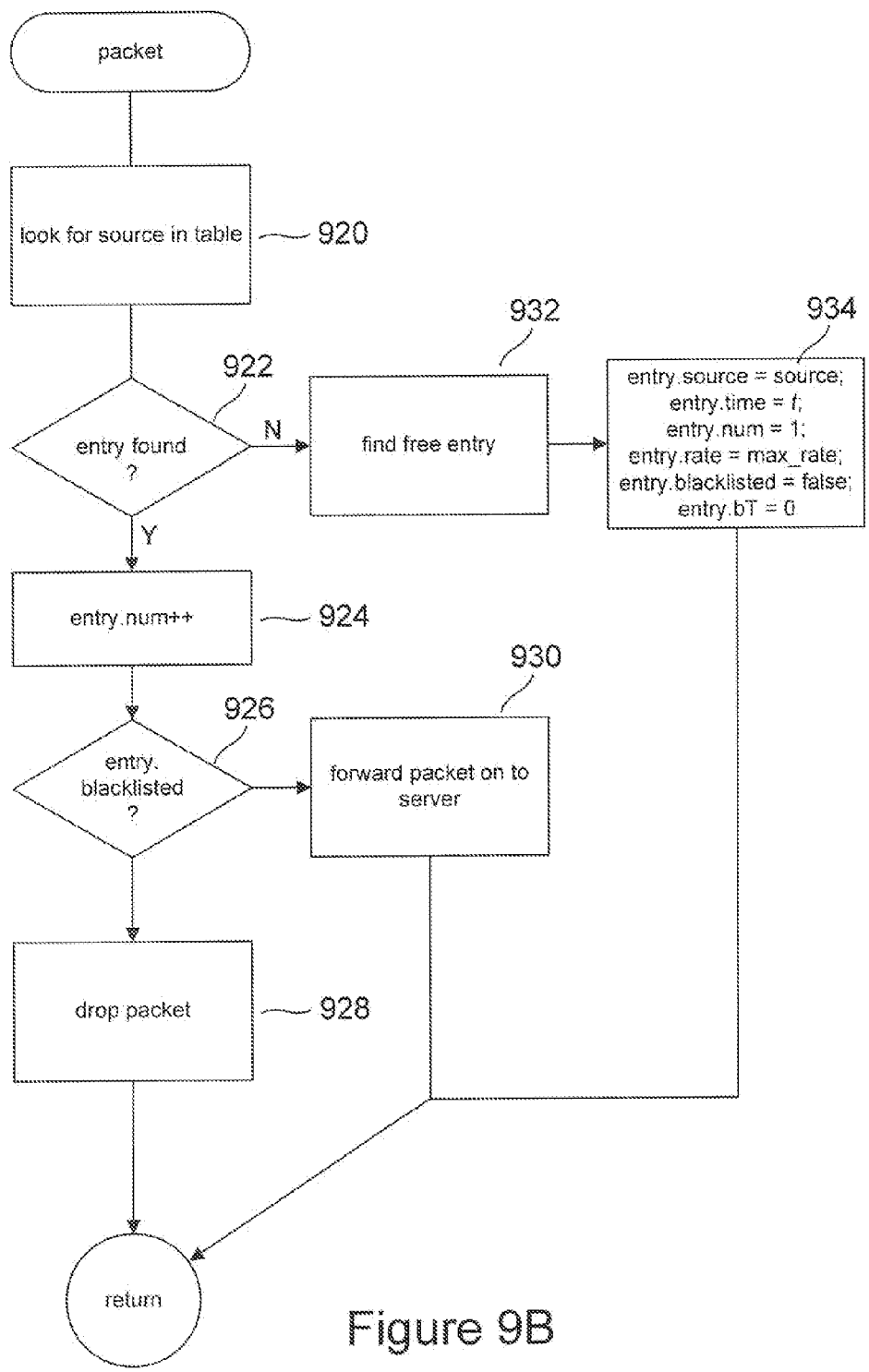

FIG. 9B provides a control-flow diagram for the routine "packet," called in step 910 of FIG. 9A. In step 920, the entry for the source of the packet is located in the source table. If an entry is found, as determined in step 922, then the field num in the source-table entry is incremented, in step 924. If the source is blacklisted, as determined in step 926, then the received packet is dropped, in step 928. Otherwise, the packet is forwarded to the server, in step 930. If an entry is not found in the source table, as determined in step 922, then a free entry is found, in step 932, and the free entry is initialized in step 934 by setting the values of the various fields of the entry as indicated in step 934. A timer mechanism is employed to time out and free stale entries.

Figure 9C:
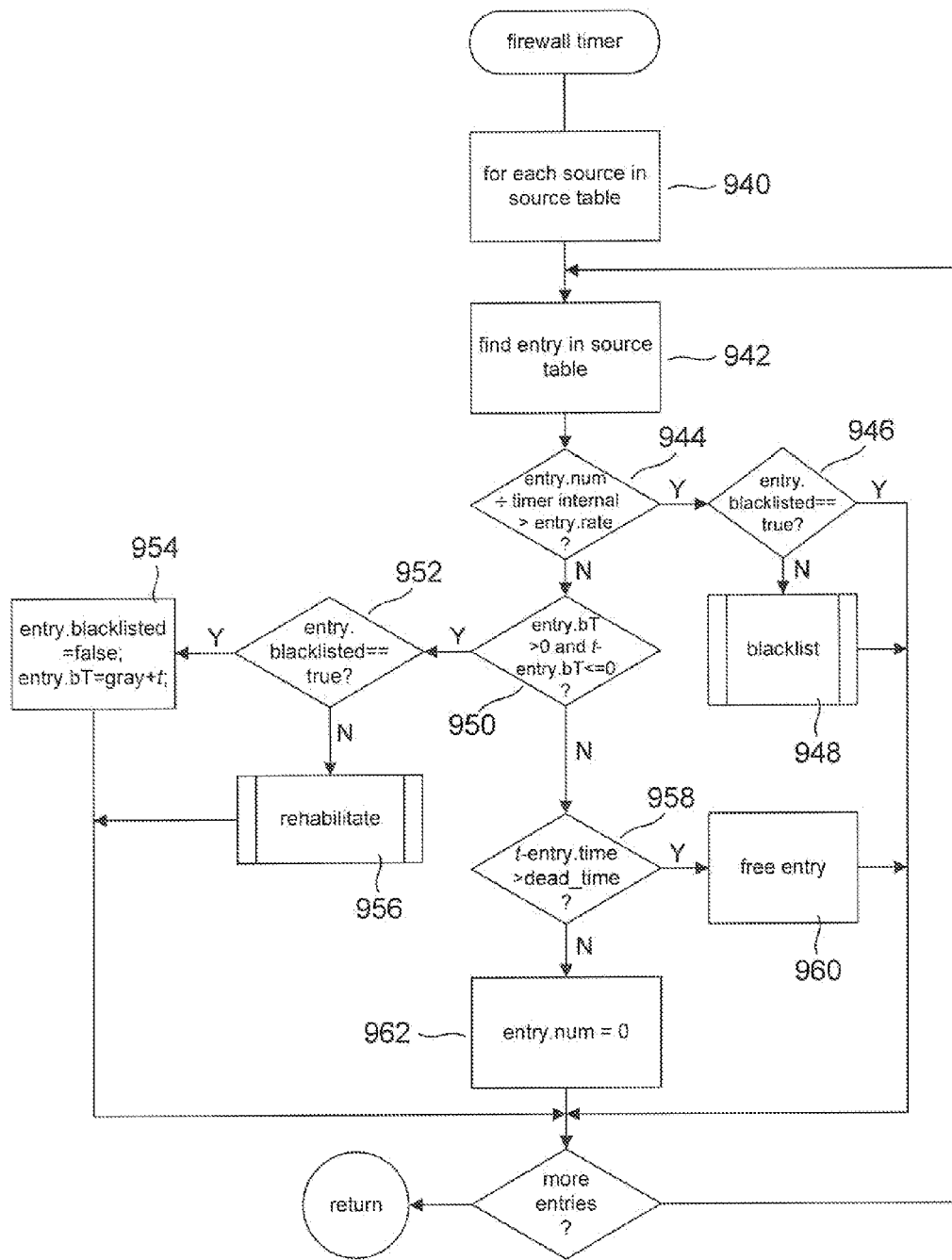

FIG. 9C provides a control-flow diagram for the routine "firewall timer," called in step 914 in FIG. 9A. When the timer expires, all of the currently active sources in the source table are considered in the for-loop beginning with step 940. In step 942, the entry in the source table for the next source is found. When the current rate of packet reception from the source, as computed from the num field in the source-table entry and the timer interval period, is greater than the maximum rate of packet reception currently allowed for the source, as determined in step 944, then if the source is not already blacklisted, as determined in step 946, the routine "blacklist" is called in step 948 to blacklist the source and stop any further packet reception from the source for a period of time. Otherwise, if a next blacklist or graylist period has expired, as determined in step 950, then if the source is currently blacklisted, as determined in step 952, the source is removed from being blacklisted and is instead graylisted, in step 954, to allow the source to transmit packets to the server at a reduced maximum rate. Otherwise, the source is graylisted, and the routine "rehabilitate" is called, in step 956, to further rehabilitate the source. When no packet has been received from the source for a time greater than "dead_time," as determined in step 958, the entry for the source in the source table is freed, in step 960. Otherwise, the field num in the entry for the source is set to 0, in step 962. Thus, on expiration of the firewall timer, all of the sources are considered. When their rate of packet transmission has exceeded their currently allowed maximum rate, they are blacklisted. Otherwise, when their current transmission rate falls below the allowed transmission rate, then formerly blacklisted sources are rehabilitated, over time, to allow the sources to again to transmit packets to the server at the maximum rate allowed for sources, in general. Rehabilitation involves one or more graylist periods, in which the source is allowed to transmit packets at a reduced maximum rate. The phrase "allowing courses to transmit at a given rate" means that no packets received from the source will be intentionally dropped unless the rate of reception, by the server, exceeds the maximum rate.

Figure 9D:
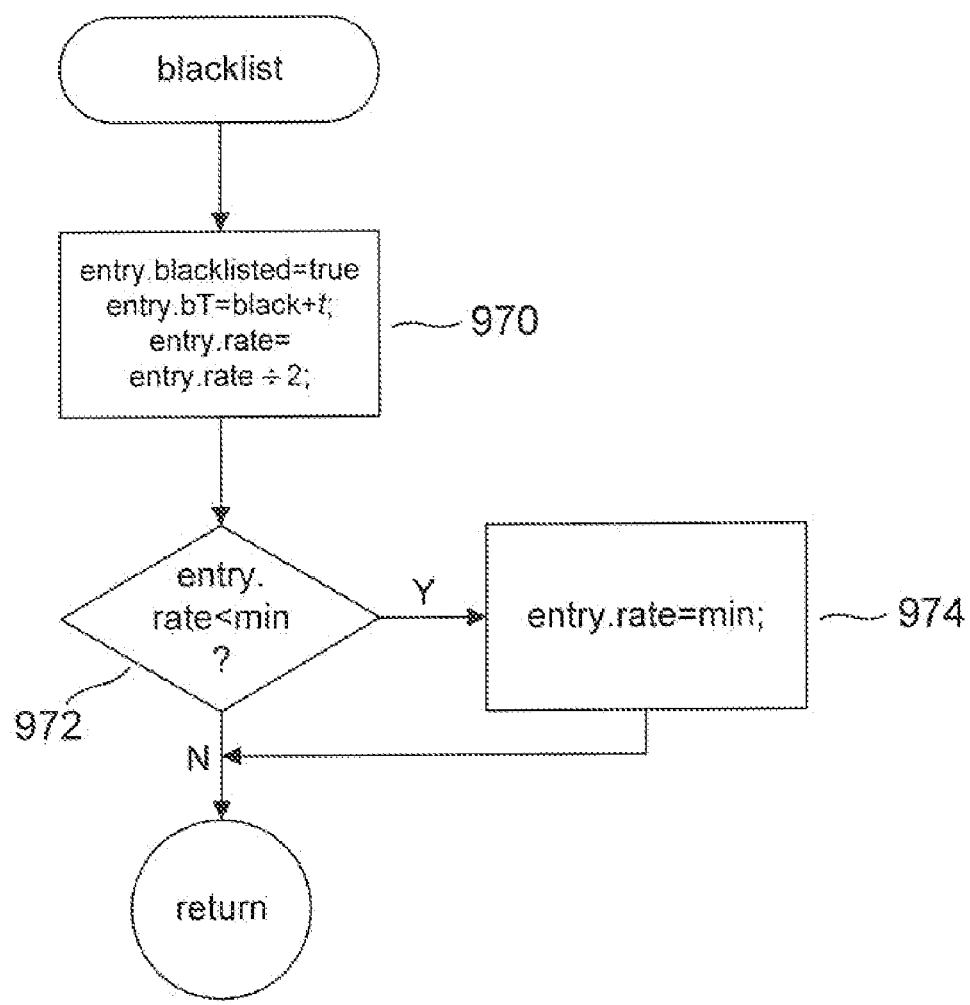

FIG. 9D provides a control-diagram for the routine "blacklist," called in step 948 of FIG. 9C. In step 970, the field blacklisted is set to TRUE, a blacklist expiration time bT is set to be the current time t plus a blacklist period black, and the maximum rate of transmission for the source is halved from its current rate. When the resulting transmission rate for the source is less than some minimum transmission rate, as determined in step 972, then the allowed transmission rate is set to a minimum value, in step 974.

Figure 9E:
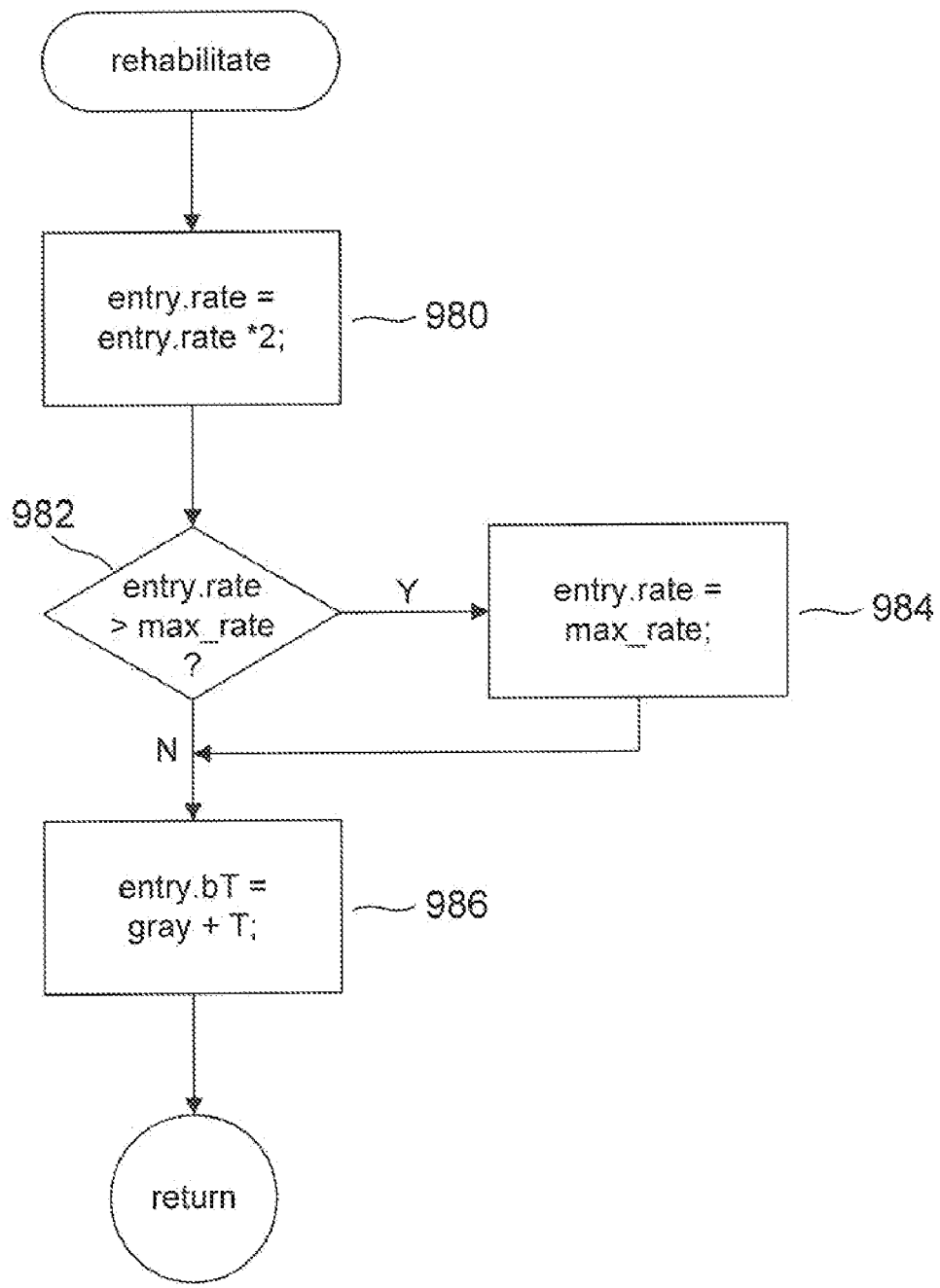

FIG. 9E provides a control-flow diagram for the routine "rehabilitate," called in step 956 of FIG. 9C. In step 980, the allowed rate of packet transmission for a source is doubled. When the rate then exceeds the maximum transmission rate allowed for any source, as determined in step 982, the maximum transmission rate for the source is set to the maximum rate in step 984. The blacklist or graylist expiration time bT is set to a graylist time, in step 986.

Of course, the automatic firewall component of the multi-tiered communications-security system can be incorporated into the probabilistic packet dropper, packet throttle, or another component of the multi-tiered communications-security system. Other, alternative implementations are also possible. For example, it may be preferable to stagger timer expirations for different sets of sources, so that a smaller number of sources is considered at each timer expiration. At the extreme, each different source can be associated with a separate timer, so that the routine "firewall timer" would not contain a loop through all current sources, but simply consider a particular source.

Figure 10:
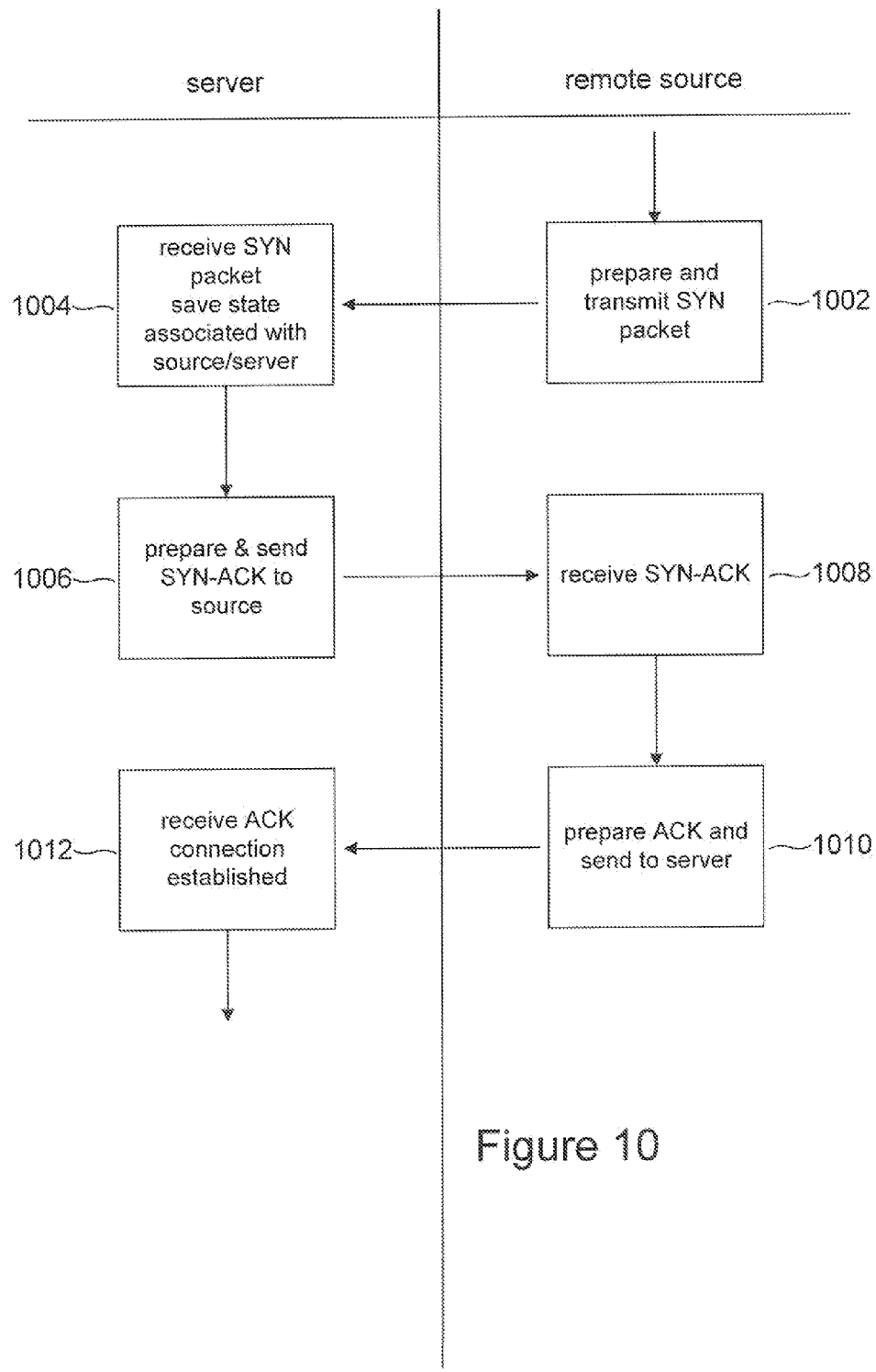
FIG. 10 illustrates a three-phase connection-establishment transaction of the TCP protocol.

Next, the SYN-flood-prevention methods discussed with reference to FIG. 3B are described, in greater detail. FIG. 10 illustrates the three-phase connection-establishment transaction of the TCP protocol. A remote client computer, or source, determines that it needs to connect to the server computer in order to conduct one or more data-transfer transactions, and, to do so, prepares and transmits a SYN packet, in step 1002, for transmission to the server. When the server receives the SYN packet, in step 1004, the server saves some state information associated with the incipient connection, identified by the communications-medium addresses of the source and server, and returns a SYN-ACK message to the source 1006. The SYN-ACK message contains a 32-bit value indicating the next sequence number expected by the server, but that value can be alternatively used, as discussed below, to transmit state information to the source. When the source receives the SYN-ACK message, in step 1008, the source prepares an ACK message and transmits it back to the server, in step 1010. When the server receives the ACK message, in step 1012, and when the returned information included in the ACK message is the same as the information included in the SYN-ACK message, then the three-phase connection-establishment transaction has successfully completed, and a communications connection is established and opened between the source and the server.

Figure 11:
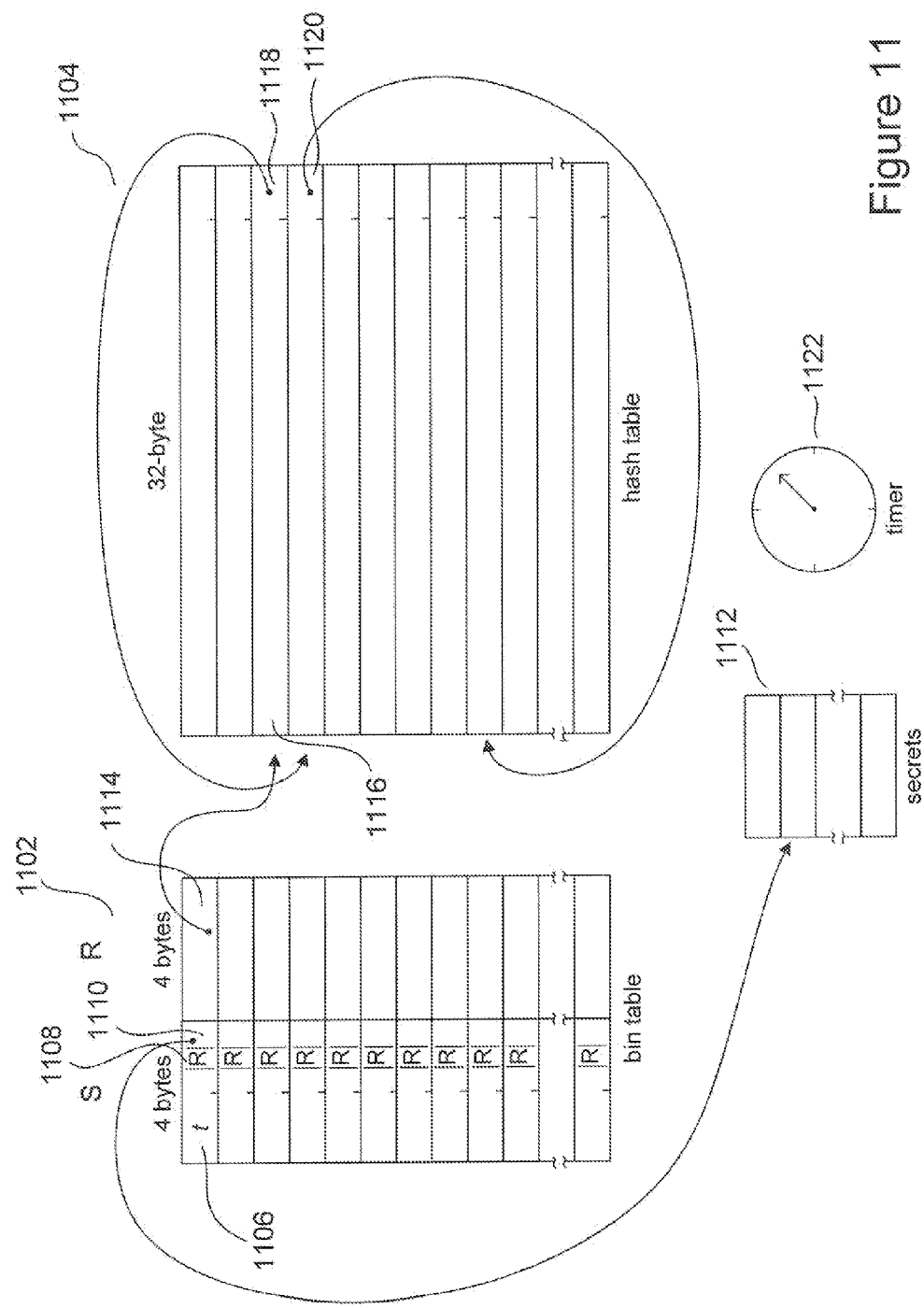
FIG. 11 illustrates data components of a SYN-flood-prevention method that represents one embodiment of the present invention.

FIG. 11 illustrates data components of a SYN-flood-prevention method that represents one embodiment of the present invention. State information for a TCP connection is stored both in a bin table 1102 and a hash table 1104. Each entry of the bin table is split into two parts. One part, referred to as "S," stores an expiration time 1106, a retry flag 1108, and a reference 1110 to a secret stored in a secrets table 1112. The other portion of a bin-table entry, referred to as "R" 1114, contains a reference to a hash-table entry 1116, with hash-table entries potentially chained by additional references 1118 and 1120 so that multiple, different server-ID/source-ID pairs that hash to the same bin-table entry can be accommodated. A timing mechanism 1122, discussed further below, is used to invalidate bin-table entries and secrets stored in the secrets table after fixed periods of time.

Figure 12:
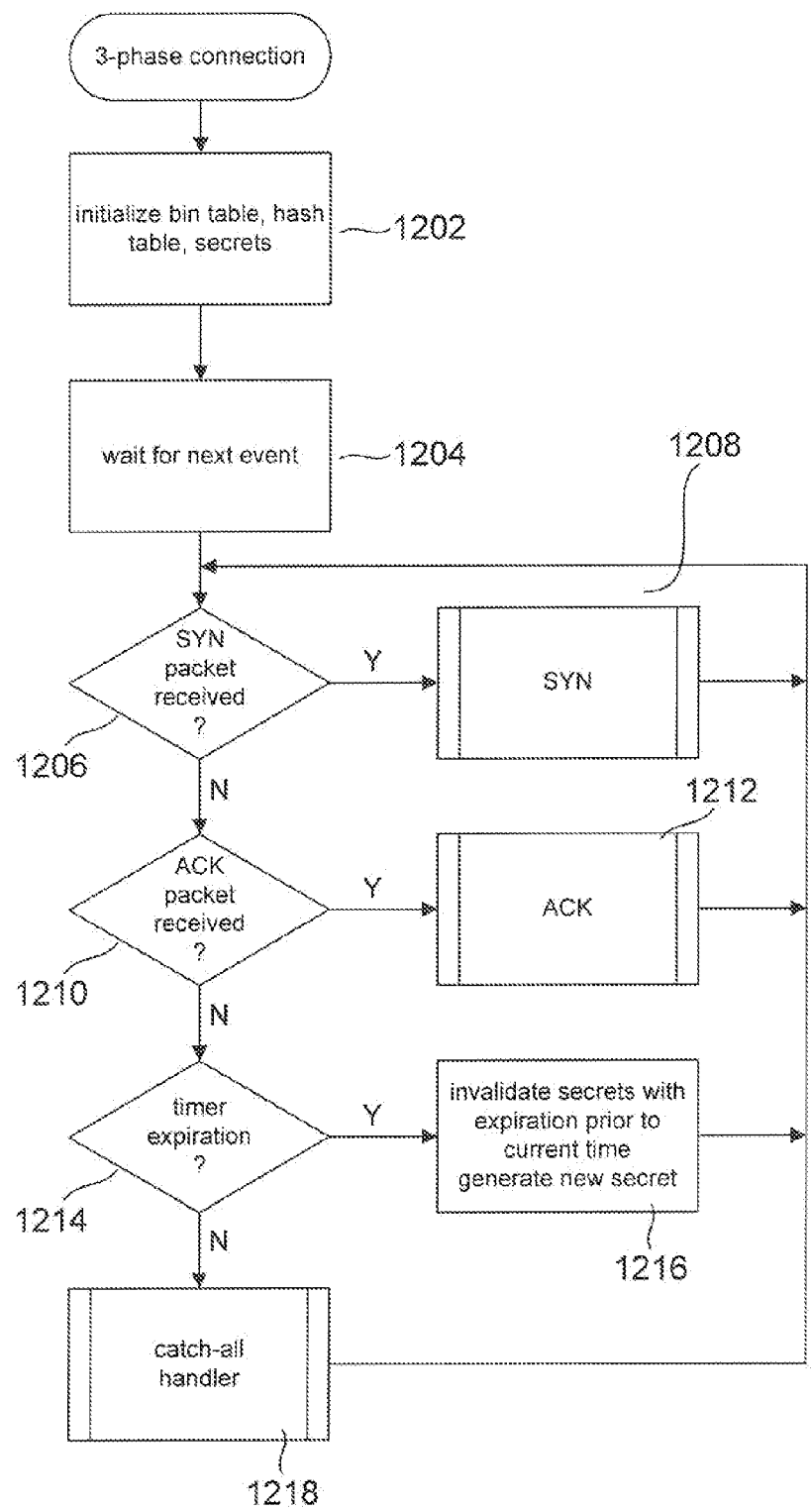
FIG. 12 provides a control-flow diagram for a three-phase connection method that represents one embodiment of the present invention.

FIG. 12 provides a control-flow diagram for a three-phase connection method that represents one embodiment of the present invention. In initial step 1202, the bin table, hash table, secrets, and timing mechanism are initialized. Then, in step 1204, the routine waits for a next event to occur, and handles that event in subsequent steps. When a next occurred event is reception of a SYN packet, as determined in step 1206, then the routine "SYN" is called, in step 1208. When the next event is reception of the ACK message at the end of the three-phase connection-establishment transaction, as determined in step 1210, then the routine "ACK" is called in step 1212. When the event is a timer expiration, as determined in step 1214, then secrets with expiration times prior to the current time are invalidated and at least one new secret is generated, in step 1216. A catch-all event handler is called for any other type of event in step 1218.

Figure 13:
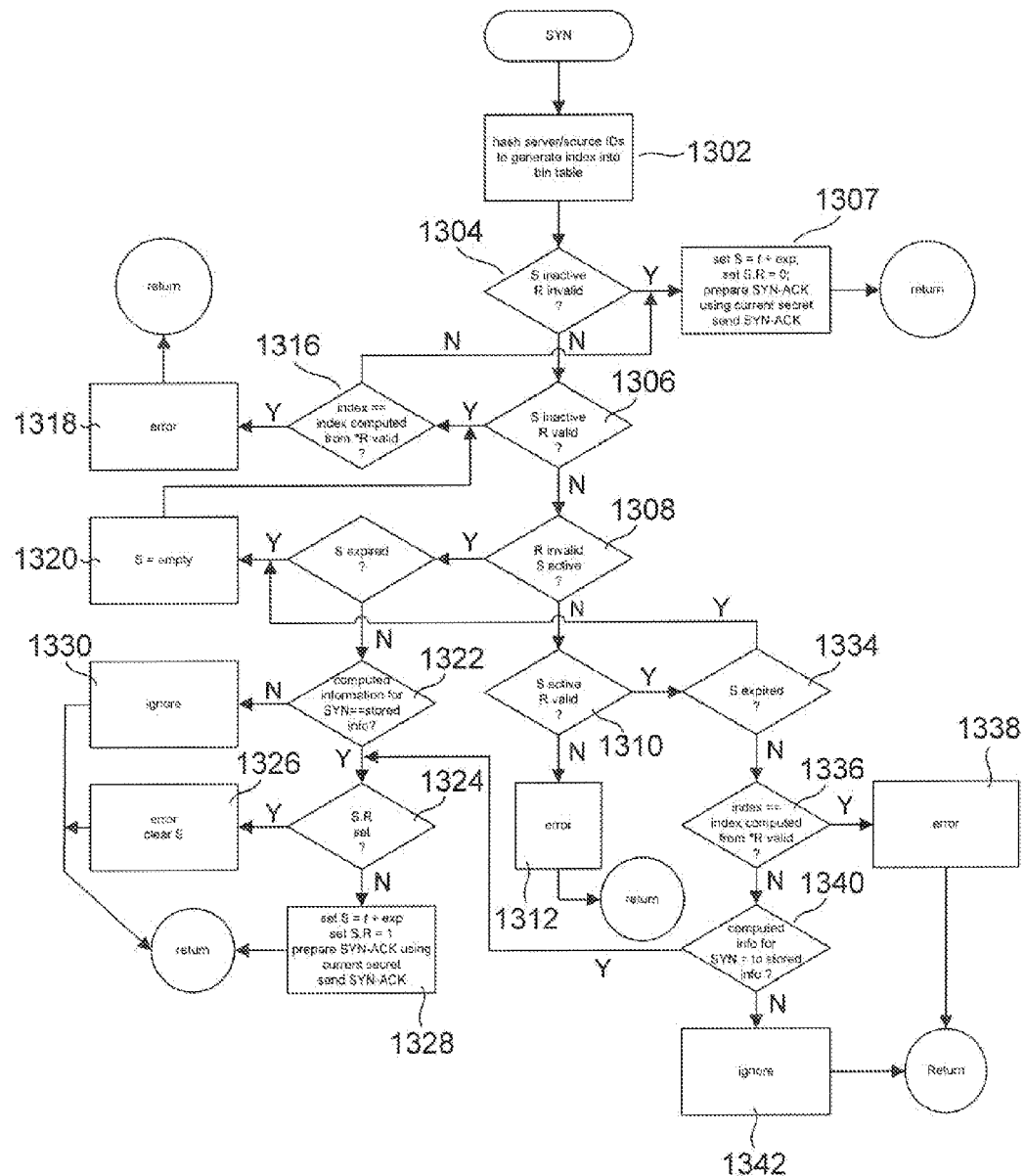
FIG. 13 provides a control-flow diagram for the routine "SYN," called in step 1208 of FIG. 12, that represents one embodiment of the present invention.

FIG. 13 provides a control-flow diagram for the routine "SYN," called in step 1208 of FIG. 12, that represents one embodiment of the present invention. First, the server ID and source IDs for the source and server are combined and hashed to generate an index into the bin table, in step 1302. Note that a server may have multiple different ports, each with different port numbers that are incorporated into the server ID. The bin table entry can be in any of four different states. The S portion of a bin-table entry can be either active or inactive, and the R portion of the bin-table entry can be valid or invalid, depending on previous events. The S portion of a bin-table entry is active when it has not expired and contains a reference to a secret in the secrets table. The R portion of a bin-table entry is valid when the bin-table references a hash-table entry representing a connection, and is otherwise invalid. The four possible states of a bin-table entry are therefore: (1) the S portion inactive and the R portion invalid, as detected in step 1304; (2) the S portion inactive and the R portion valid, as detected in step 1306; (3) the S portion active and the R portion invalid, as determined in step 1308; and (4) the S portion active and the R portion valid, as determined in step 1310. Any other state is an error, handled in step 1312.

For case (1), there is no pending or completed connection for the index value generated from the serve-ID-source-ID pair, and therefore the S portion of the bin-table entry is initialized, in step 1306, to indicate that a pending connection exists for the index value, including storing a reference to the secret in the secrets table used to scramble or encrypt the information returned to the source. For case (2) there is a current connection for the index but no pending connection. If the SYN message is directed to the current connection, as determined in step 1316, by using information in a referenced hash-table entry to check the server-ID/source-ID pair in that entry for correspondence with the server-ID/source-ID for the current SYN message, then an error condition has occurred, which is handled in step 1318. Otherwise, a new pending connection is prepared in step 1314. For case (3), there is already a pending connection, but no completed connection for the index. In this case, if the bin entry has expired, then the S portion of the bin entry is cleared, in step 1320, and control passes to step 1316 to determine whether or not an error condition has arisen due to resending of a SYN message for a timed-out, pending connection. Otherwise, if the SYN message is directed to the already active, pending connection, as determined in step 1322, by computing a reference to a secret for encrypting or scrambling information for the SYN information and checking to see if that reference is identical to the reference stored in the S portion of the bin-table entry, then if the retry bit is set in the bin-table entry, as determined in step 1324, an error results, and is handled in step 1326. Otherwise, the SYN-ACK message previously sent by the server must have been missed, or dropped, and is resent in step 1328. When the SYN message is not directed to the already pending connection, the SYN message is ignored, in step 1330. For case (4) there is already a connection for the index and there is also a pending connection for the index. When the bin entry has expired, as determined in step 1334, then control passes to step 1320. Otherwise, when the SYN message is directed to the already established connection, as determined in step 1336, an error has occurred and is handled in step 1338. When the SYN message is directed to the pending connection, as determined in step 1340, by computing a reference to a secret for encrypting or scrambling information for the SYN information and checking to see if that reference is identical to the reference stored in the S portion of the bin-table entry, control flows to step 1324. Otherwise, the SYN message is ignored, in step 1342.

Figure 14:
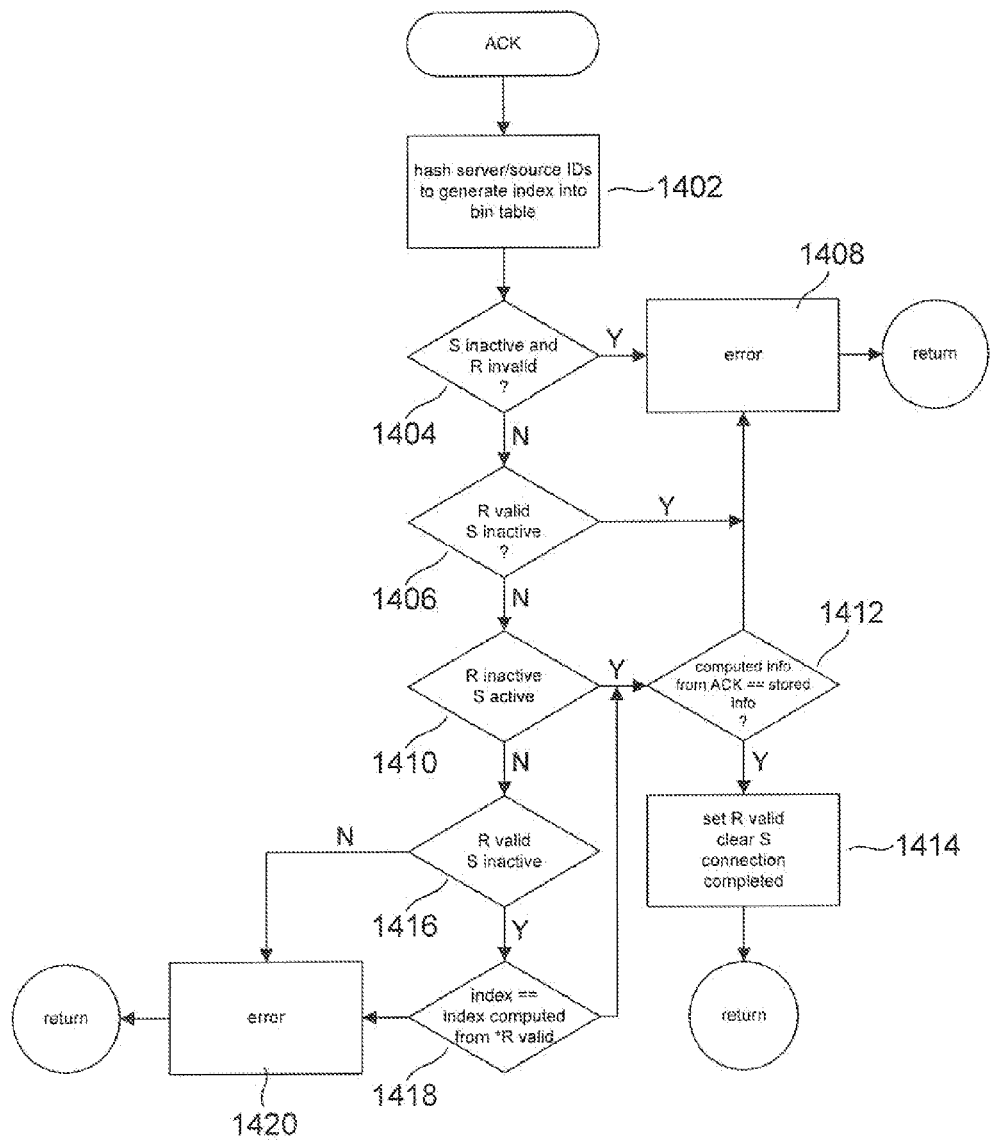
FIG. 14 provides a control-flow diagram for the routine "ACK," called in step 1212 of FIG. 12, that represents one embodiment of the present invention.

FIG. 14 provides a control-flow diagram for the routine "ACK," called in step 1212 of FIG. 12, that represents one embodiment of the present invention. The server and source IDs are hashed to generate an index into the bin table, in step 1402. The same four cases for the bin-table entry discussed above, with reference to FIG. 13, are again considered by the routine "ACK" in FIG. 14. When the ACK message is directed to an index without either a current connection or a pending connection, or is directed to an index without a pending connection, as determined in steps 1404 and 1406, then an error has occurred, and is handled in step 1408. When the ACK message is directed to an index with a pending connection, but no current connection, as determined in step 1410, then if the ACK message is directed to the pending connection, as determined in step 1412, by using the stored reference to the secret used for originally encrypting or scrambling information for the SYN information to recompute the encrypted or scrambled information and checking to see if that the two versions are identical, the pending connection has completed successfully, when the returned information is identical to the information sent in the SYN_ACK message, and a full hash-table entry is prepared for the pending connection in step 1414. Otherwise, when the ACK message was directed to the current connection, an error has arisen and is handled in step 1408. The ACK message is directed to an index representing both a current connection and a pending connection, as determined in step 1416, then when the ACK message is directed to the current connection, as determined in step 1418, an error results, and is handled in step 1420. Otherwise, control flows to step 1412 to determine whether or not the ACK messaged is directed to the pending connection, and to appropriately handle the ACK message in that case.

Although the present invention has been described in terms of particular embodiments, it is not intended that the invention be limited to these embodiments. Modifications within the spirit of the invention will be apparent to those skilled in the art. For example, the resource-control, probabilistic-packet-dropper, packet-rate-throttle, automatic-firewall, and connection-request components can be implemented in any of numerous different programming languages to run on, within, or with any of numerous different operating systems and other control programs, using different modular organizations, data structures, control structures, variables, and with other such programming parameters varied according to implementation constraints. Embodiments of the present invention may be incorporated into any computer or system of computers that communicates with remote entities via electronic communications. Different measurements may be used to detect incipient resource exhaustion and/or packet overload in a computer system and respond by activating probabilistic packet dropping. Different timer intervals can be used, different periods of gray listing and blacklisting, different maximum rates and individual-source maximum rates, and other parameters of the discussed invention can be varied, as needed, to properly secure the communications components of a server computer.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A server computer comprising:
   a communications receiver that receives communications packets through a communications medium from remote computers;
   a communications transmitter that transmits communications packets to the remote computers through the communications medium;
   an input memory buffer into which communications packets received by the communications receiver are queued by the communications receiver;
   an output memory buffer into which communications packets are queued by a processor for transmission to the communications medium by the communications transmitter; and
   electronic data-storage resources into which a processor stores information related to a state for each communications connections between the server computer and remote computers, including a first table that stores, in each entry, a first portion of the state information for a communications connection as well as a reference to an entry in a second table that stores a second portion of the state information for the communications connection, the number of bits used to encode the first portion of the state information less than 25% of the number of bits used to encode the second portion of the state information;
   wherein the processor stores sufficient state information into an entry of the first table to initiate establishment of a communications connection upon receiving an initial connection-request packet from a remote computer while deferring storing complete state information for the communications connection until completion of a multi-packet exchange, according to a multi-phase connection protocol, so that electronic data-storage resources are less likely to be exhausted by storing complete state information for initiated communications connections prior to completion of the multi-packet exchange for the initiated communications connections.

2. The server computer of claim 1 wherein each entry of the first table includes:
    a time-associated value;
    a retry flag;
    a field for storing a reference to an electronically stored secret; and
    a field for storing a reference to an entry in the second table.

3. The server computer of claim 2 wherein each entry of the second table stores state information for a communications connection associated with an entry in the first table that references the entry of the second table, the complete state information for a particular communications connection distributed between an entry in the first table and an entry in the second table.

4. The server computer of claim 3 wherein each entry of the second table additionally includes a field for a reference to another entry in the second table, so that state information for multiple communications connections for which computed hash values reference a single entry of the first table can be stored in multiple, linked entries of the second table.

5. The server computer of claim 3 wherein the processor processes communications packets of multi-packet exchanges, according to the multi-phase connection protocol, by calling a first handler to process each received initial connection-request packet, calling a second handler to process each received communications-connection-acknowledgement packet, and by calling a third handler to process each timer-associated event.

6. The server computer of claim 5 wherein the first handler computes a hash value from identifiers for the server computer and a remote computer extracted from the received initial connection-request packet and uses the hash value as a reference to an entry in the first table.

7. The server computer of claim 6 wherein the first handler determines whether the entry of the first table referenced by the hash value computed from identifiers for the server computer and the remote computer extracted from the received initial connection-request packet is active and valid.

8. The server computer of claim 7
    wherein the entry of the first table is active when the time-associated value in the entry is not expired and when the entry contains a valid reference to a stored secret and is otherwise inactive; and
    wherein the entry of the first table is valid when the entry contains a valid reference to an entry of the second table and is otherwise invalid.

9. The server computer of claim 7 wherein, when the entry of the first table is inactive and invalid, the first handler
    initializes the entry of the first table to include an unexpired time-associated value, a reference to a stored secret used to scramble or encrypt a sever-acknowledgement packet returned to the remote computer, from which the initial connection-request packet was received, and no valid reverence to an entry of the second table; and
    prepares the sever-acknowledgement packet and queues the sever-acknowledgement packet to the output memory buffer.

10. The server computer of claim 7 wherein, when the entry of the first table is inactive and valid, the first handler
    computes a value from data stored in the entry of the second table referenced by the entry of the first table;
    when the computed value is identical to a value computed from the identifiers for the server computer and the remote computer extracted from the received initial connection-request packet, determining that an error has occurred; and otherwise
    when the computed value is not identical to a value computed from the identifiers for the server computer and the remote computer extracted from the received initial connection-request packet,
    initializes the entry of the first table to include an unexpired time-associated value, a reference to a stored secret used to scramble or encrypt a sever-acknowledgement packet returned to the remote computer from which the initial connection-request packet was received, and no valid reverence to an entry of the second table, and
    prepares the sever-acknowledgement packet and queues the sever-acknowledgement packet to the output memory buffer.

11. The server computer of claim 7 wherein, when the entry of the first table is active and invalid, the first handler
    when the time-associated value of the entry of the first table has expired,
    computes a value from data stored in the entry of the second table referenced by the entry of the first table,
    when the computed value is identical to a value computed from the identifiers for the server computer and the remote computer extracted from the received initial connection-request packet, determines that an error has occurred, and otherwise
    when the computed value is not identical to a value computed from the identifiers for the server and remote computer extracted from the received initial connection-request packet
    initializes the entry of the first table to include an unexpired time-associated value, a reference to a stored secret used to scramble or encrypt a sever-acknowledgement packet returned to the remote computer from which the initial connection-request packet was received, and no valid reverence to an entry of the second table, and
    prepares the sever-acknowledgement packet and queues the sever-acknowledgement packet to the output memory buffer; and
    when the time-associated value of the entry of the first table has not expired,
    computes a reference to a stored secret to obtain a computed reference,
    when the computed reference is identical to the reference to the stored secret in the entry of the first table and the retry flag in the entry of the first table is set, determines that an error has occurred,
    when the computed reference is identical to the reference to the stored secret in the entry of the first table and the retry flag in the entry of the first table is not set,
    sets the retry flag in the entry of the first table,
    initializes the entry of the first table to include an unexpired time-associated value, a reference to a stored secret used to scramble or encrypt a sever-acknowledgement packet returned to the remote computer from which the initial connection-request packet was received, and no valid reverence to an entry of the second table, and
    prepares the sever-acknowledgement packet and queues the sever-acknowledgement packet to the output memory buffer, and when the computed reference is not identical to the reference to the stored secret in the entry of the first table, disregards the initial connection-request packet.

12. The server computer of claim 7 wherein, when the entry of the first table is active and valid, the first handler
   computes a value from data stored in the entry of the second table referenced by the entry of the first table;
   determines whether the time-associated value of the entry of the first table has expired;
   when the time-associated value has expired,
   when the computed value is identical to a value computed from the identifiers for the server computer and the remote computer extracted from the received initial connection-request packet, determines that an error has occurred, and
   when the computed value is not identical to a value computed from the identifiers for the server computer and the remote computer extracted from the received initial connection-request packet,
   initializes the entry of the first table to include an unexpired time-associated value, a reference to a stored secret used to scramble or encrypt a sever-acknowledgement packet returned to the remote computer, which identifier was extracted from the initial connection-request packet received, and no valid reverence to an entry of the second table, and
   prepares the sever-acknowledgement packet and queues the sever-acknowledgement packet to the output memory buffer; and
   when the time-associated value of the entry of the first table has not expired,
      when the computed value is identical to a value computed from the identifiers for the server computer and the remote computer extracted from the received initial connection-request packet, determines that an error has occurred, and otherwise
      computes a reference to a stored secret to obtain a computed reference,
      when the computed reference is identical to the reference to the stored secret in the entry of the first table and the retry flag in the entry of the first table is set, determines that an error has occurred,
      when the computed reference is identical to the reference to the stored secret in the entry of the first table and the retry flag in the entry of the first table is not set,
      sets the retry flag in the entry of the first table,
      initializes the entry of the first table to include an unexpired time-associated value, a reference to a stored secret used to scramble or encrypt a sever-acknowledgement packet returned to the remote computer from which the initial connection-request packet was received, and no valid reverence to an entry of the second table, and
      prepares the sever-acknowledgement packet and queues the sever-acknowledgement packet to the output memory buffer, and
      when the computed reference is not identical to the reference to the stored secret in the entry of the first table, disregards the initial connection-request packet.

13. The server computer of claim 1 further comprising:
   a probabilistic-packet-dropper that, when activated, randomly drops a specified fraction of incoming communications packets rather than queue the specified fraction of incoming communications packets to the input memory buffer.

14. The server computer of claim 1 further comprising:
   an automatic-firewall that monitors a rate of packet reception from each of the remote computers and, when the rate of packet reception for a remote computer rises above a maximum rate, ceases accepting packets from the remote computer for a blacklisting period, after which the remote computer is rehabilitated during subsequent graylisting periods.

15. The server computer of claim 1 further comprising:
   a packet-rate-throttle that monitors an overall packet-reception rate and activates a probabilistic-packet-dropper when the overall packet-reception rate exceeds a maximum allowable rate.

16. The server computer of claim 1 further comprising:
   resource-controllers that monitor resource usage within the sever computer and, when an incipient resource exhaustion is detected, activates a probabilistic-packet-dropper.

17. A method for distributing pending-connection state in a server computer, and quickly terminating pending connections when not timely completed in order to prevent resource exhaustion, the method comprising:
   receiving, by a communications receiving component, communications packets through a communications medium from remote computers;
   transmitting, by a communications transmission component, the communications packets to the remote computers through the communications medium;
   queuing, by the communications receiving component, the communications packets received into input memory buffer;
   queuing, by a processing component, the communications packets into an output memory buffer for transmission to the communications medium by the communications transmissions component; and
   storing, by a processor, state information related to states of communications connections between the server computer and the remote computers in a first table, allocated from electronic data-storage resources, that stores, in each entry, a first portion of the state information for a communications connection as well as a reference to an entry in a second table that stored a second portion of the state information for the communications connection, the number of bits used to encode the first portion of the state information less that 25% of the number of bits used to encode the second portion of the state information; wherein the processor stores sufficient state information into an entry of the first table to initiate establishment of a communications connection upon receiving an initial connection-request packet from a remote computer while deferring storing complete state information for the communications connection until completion of a multi-packet exchange, according to a multi-phase connection protocol, so that electronic data-storage resources are less likely to be exhausted by storing complete state information for initiated communication connections.

* * * * *

UNITED STATES PATENT AND TRADEMARK OFFICE
CERTIFICATE OF CORRECTION

PATENT NO. : 8,341,727 B2
APPLICATION NO. : 12/075600
DATED : December 25, 2012
INVENTOR(S) : William S. Worley et al.

It is certified that error appears in the above-identified patent and that said Letters Patent is hereby corrected as shown below:

Title Page, Item (73), Assignee; delete the words "Se Cure 64 Software Corporation" and insert the words -- Secure64 Software Corporation --.

Signed and Sealed this
Fifth Day of February, 2013

Teresa Stanek Rea
*Acting Director of the United States Patent and Trademark Office*